(12) United States Patent
Okamoto et al.

(10) Patent No.: US 9,888,060 B2
(45) Date of Patent: Feb. 6, 2018

(54) CONTROL METHOD, COMMUNICATIONS TERMINAL, AND CONTROL SYSTEM

(71) Applicant: Panasonic Intellectual Property Corporation of America, Torrance, CA (US)

(72) Inventors: Erina Okamoto, Shiga (JP); Toshiaki Tanaka, Kyoto (JP); Masaru Yamaoka, Osaka (JP); Mahbub Rashid, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 585 days.

(21) Appl. No.: 14/537,810

(22) Filed: Nov. 10, 2014

(65) Prior Publication Data

US 2015/0148925 A1 May 28, 2015

(30) Foreign Application Priority Data

Nov. 28, 2013 (JP) .................................. 2013-246753

(51) Int. Cl.
*H04L 29/08* (2006.01)
*H04L 12/28* (2006.01)

(52) U.S. Cl.
CPC ............ *H04L 67/10* (2013.01); *H04L 12/282* (2013.01); *H04L 12/2816* (2013.01);
(Continued)

(58) Field of Classification Search
CPC ......... H04L 67/10; H04L 67/12; H04L 67/34; H04L 12/282; H04L 12/2816; H04L 2012/2841
See application file for complete search history.

(56) References Cited

U.S. PATENT DOCUMENTS

| 2003/0100962 A1* | 5/2003 | Sumita ................ H04L 12/2803 700/65 |
| 2005/0188050 A1* | 8/2005 | Son ..................... H04L 12/2805 709/208 |

(Continued)

FOREIGN PATENT DOCUMENTS

| JP | 2005-323070 | 11/2005 |
| JP | 2012-037783 | 2/2012 |

*Primary Examiner* — Charles E Anya

(74) *Attorney, Agent, or Firm* — Greenblum & Bernstein, P.L.C.

(57) ABSTRACT

A control method includes receiving setting information containing a first property representing a property of an operation performed by one or more target appliances and a setting of the first property, obtaining correspondence information between device information identifying each of the appliances and a second property representing a property of an operation performed by the appliance, extracting the device information items of the target appliances from among the device information items in the correspondence information, the device information items each having a second property that is the same as the first property, generating a plurality of control information items each associated with each of the extracted device information items of one or more target appliances, containing the setting information and a predetermined information corresponding to the first property and each of the device information items, transmitting the control information to the target appliance through wireless communication.

12 Claims, 21 Drawing Sheets

(52) U.S. Cl.
CPC .............. *H04L 67/12* (2013.01); *H04L 67/34* (2013.01); *H04L 2012/2841* (2013.01)

(56) References Cited

U.S. PATENT DOCUMENTS

| | | | |
|---|---|---|---|
| 2010/0286801 A1* | 11/2010 | Yum | H04L 12/2809 700/90 |
| 2011/0138327 A1* | 6/2011 | Scott | G06F 3/0481 715/810 |
| 2012/0302166 A1* | 11/2012 | Yamaoka | H04W 8/22 455/41.1 |
| 2012/0309381 A1* | 12/2012 | Almeda | G08C 23/04 455/420 |
| 2014/0087660 A1* | 3/2014 | Kim | H04L 12/282 455/41.1 |

* cited by examiner

| DEVICE ID | DEVICE NAME | OPERATION PROPERTY | | | | |
|---|---|---|---|---|---|---|
| | | TIME | TIME LENGTH | TEMPERATURE | INTENSITY | START/STOP |
| A010 | COOKING RANGE | | ○ | ○ | | ○ |
| B010 | RICE COOKER | ○ | | | | ○ |
| C010 | IH COOKING HEATER | | | | ○ | ○ |
| D010 | REFRIGERATOR | | | ○ | ○ | |
| E010 | WASHING MACHINE | ○ | | | ○ | ○ |
| F010 | SPHYGMOMANOMETER | | | | | ○ |
| G010 | BODY COMPOSITION METER | | | | | ○ |
| H010 | ACTIVE METER | | | | | ○ |
| J010 | TV 1 | | ○ | | | ○ |
| K010 | DIGITAL CAMERA | | | | | ○ |
| L010 | DVD RECORDER | ○ | ○ | | | ○ |
| J011 | TV 2 | | ○ | | | ○ |

FIG. 5

| DEVICE ID | DEVICE NAME | OPERATION PROPERTY | | | | |
| --- | --- | --- | --- | --- | --- | --- |
| | | TIME | TIME LENGTH | TEMPERATURE | INTENSITY | START/STOP |
| B010 | RICE COOKER | ○ | | | | ○ |
| E010 | WASHING MACHINE | ○ | | | ○ | ○ |
| L010 | DVD RECORDER | ○ | ○ | | | ○ |

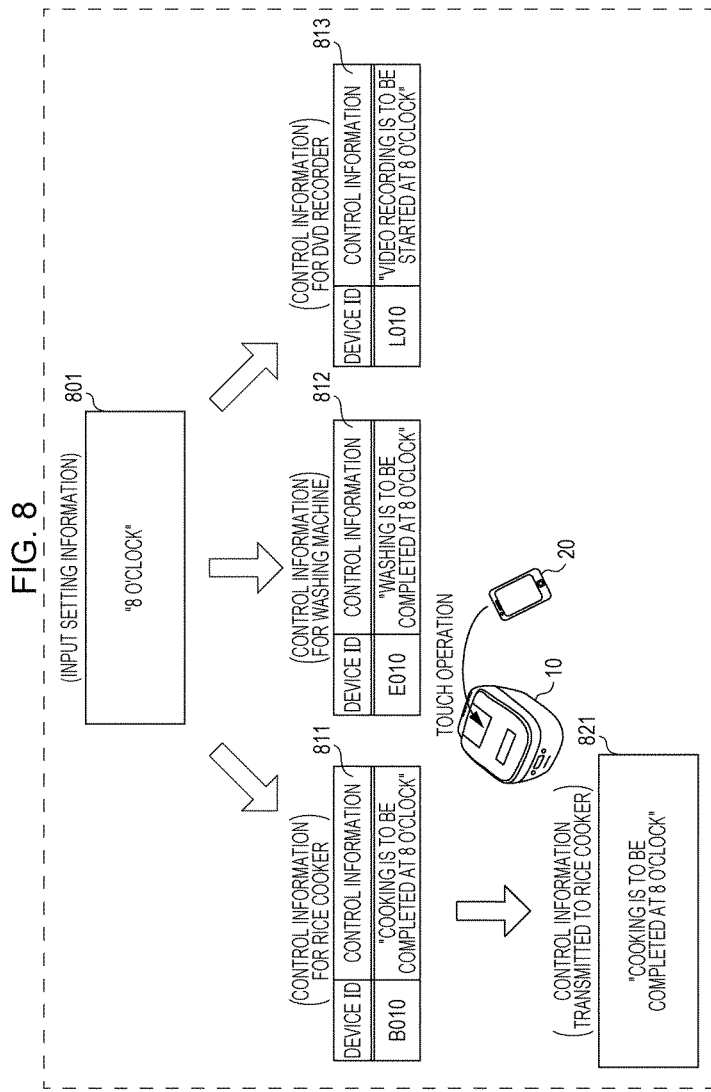

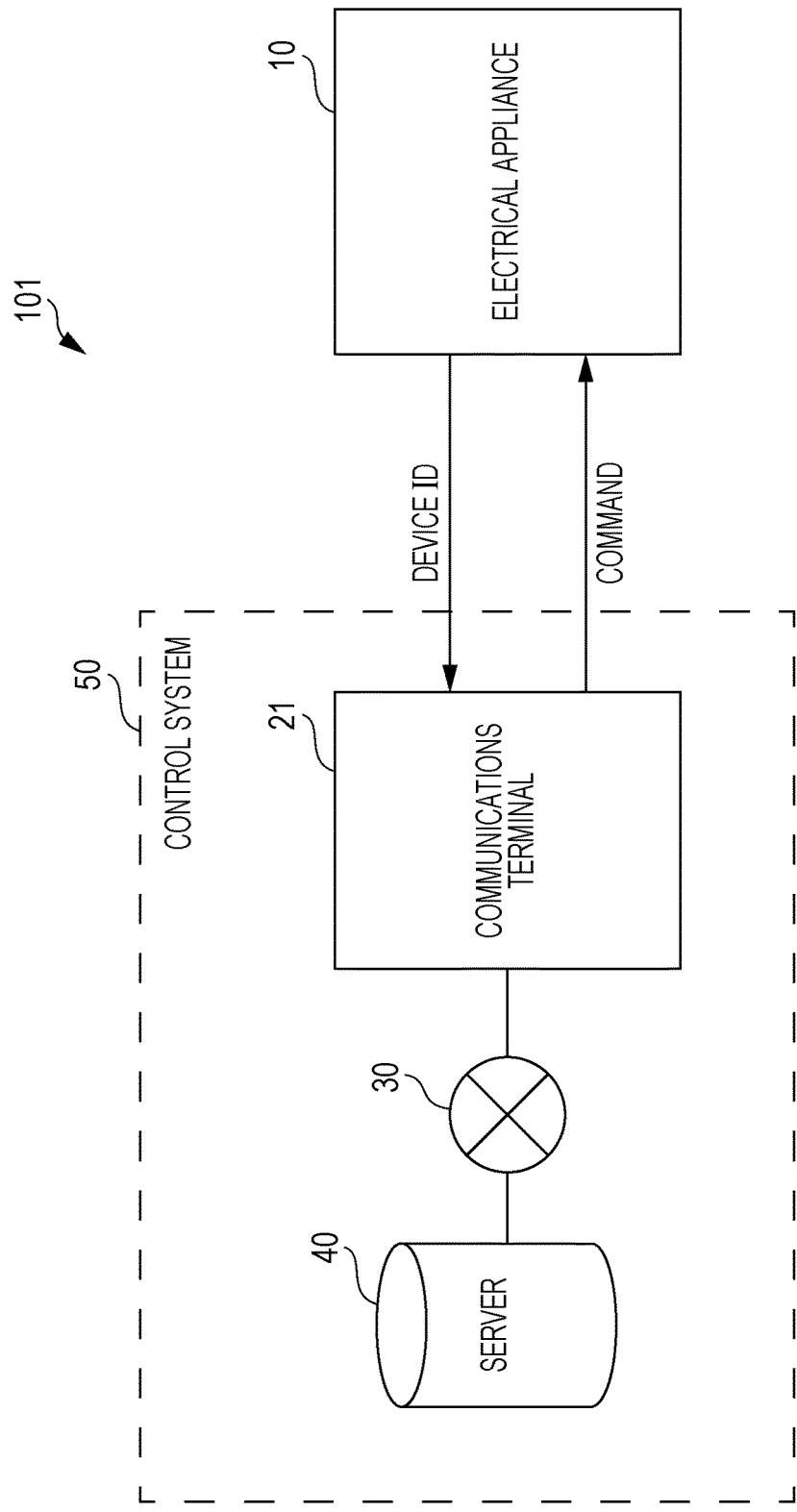

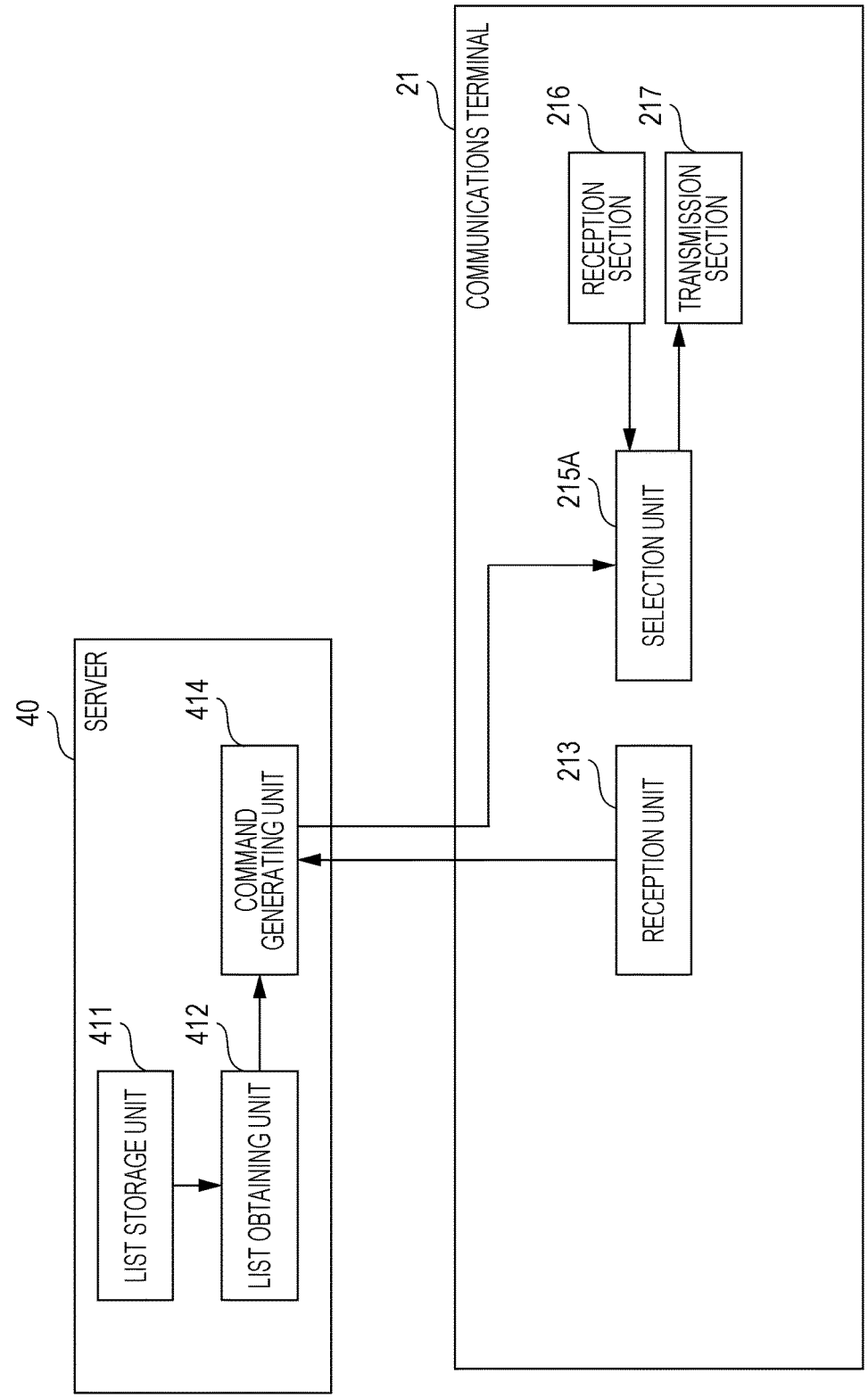

CONTROL METHOD, COMMUNICATIONS TERMINAL, AND CONTROL SYSTEM

This application claims priority to Japanese Patent Applications No. 2013-246753, filed on Nov. 28, 2013, the contents of each of which are hereby incorporated by reference.

BACKGROUND

1. Technical Field

The present disclosure relates to a control method, a communications terminal, and a control system.

2. Description of the Related Art

In recent years, home electrical appliances (hereinafter simply referred to as "electrical appliances") that receive and transmit information from and to an external communication terminal via a network have been widely developed. By using such an electrical appliance, a user can transmit a request indicating an operation to be performed by the electrical appliance to the electrical appliance via a communications terminal, such as a personal computer (PC) or a cell phone. In this manner, the user can control the electrical appliance.

For example, Japanese Unexamined Patent Application Publication No. 2005-3230701 describes a technology in which a user can select an electrical appliance to be controlled using a communications terminal and input a type of operation to be performed by the electrical appliance to the communications terminal as a request. Thus, the user can control the external electrical appliance using the communications terminal.

SUMMARY

In the above-described technology, it is troublesome for a user to perform an operation to select an electrical appliance and, thereafter, perform an operation to specify a type of operation to be performed by the electrical appliance in order to control the electrical appliance. In addition, a large processing load is imposed on a device that receives such operations from the user, which is problematic.

Thus, a non-limiting exemplary embodiment of the present disclosure provides a control method that can control an electrical appliance through a less number of operations.

A control method according to an aspect of the present disclosure, A control method executed by a communications terminal, the control method including receiving setting information containing a first property and a setting of the first property, the first property representing a property of an operation performed by one or more target appliances to be controlled, obtaining correspondence information between device information identifying each of a plurality of the appliances and a second property, the second property representing a property of an operation performed by the appliance identified by the device information, extracting the device information items of one or more target appliances from among the device information items in the correspondence information, the device information items each having a second property that is the same as the first property contained in the setting information, generating a plurality of control information items each associated with each of the extracted device information items of one or more target appliances, containing the setting information and a predetermined information corresponding to the first property of the setting information and each of the device information items, receiving the device information regarding the target appliance from the target appliance through wireless communication, selecting, from among the generated control information items, the control information item indicating the operation performed by the target appliance identified by the received device information; and transmitting the selected control information item to the target appliance through wireless communication.

The above-described collective embodiments and particular embodiment may be realized by a system, a method, an integrated circuit, a computer program, a computer readable recording medium, such as a compact disc read only memory (CD-ROM), or any combination of a system, a method, an integrated circuit, a computer program, and a computer readable recording medium.

According to the control method of the disclosure, an electrical appliance can be controlled through a minimized number of operations.

Additional benefits and advantages of the disclosed embodiments will be apparent from the specification and Figures. The benefits and/or advantages may be individually provided by the various embodiments and features of the specification and Figures, and need not all be provided in order to obtain one or more of the same.

BRIEF DESCRIPTION OF THE DRAWINGS

FIG. 5 illustrates an extracted list according to the first exemplary embodiment.

FIG. 8 illustrates a control method according to the first exemplary embodiment.

FIG. 9A is a schematic illustration of the overview of a communication system according to a second exemplary embodiment.

FIG. 10 is a block diagram of the functional configuration of the communications terminal and a server according to the second exemplary embodiment.

Figure 1:
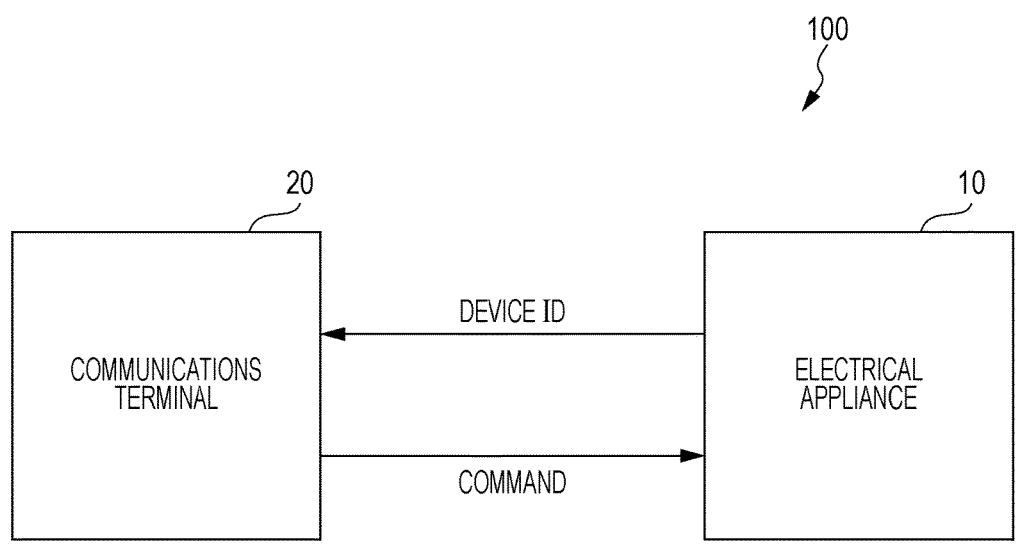
FIG. 1 is a schematic illustration of the overview of a communication system according to a first exemplary embodiment.

DETAILED DESCRIPTION (Underlying Knowledge Forming Basis of the Present Disclosure)

The present inventors found that the control method that control an electrical appliance described in "Description of the Related Art" has a following problem.

That is, in the existing control method, to control an electrical appliance using the communications terminal, a user needs to select an electrical appliance to be controlled and, thereafter, input a user's request. This procedure is not user-friendly for the user to operate the electrical appliance.

Japanese Unexamined Patent Application Publication No. 2005-3230701 describes a technique for controlling an electrical appliance using a communications terminal. More specifically, the communications terminal acquires the device ID of the electrical appliance. Subsequently, an authentication server performs user authentication using the device ID of the electrical appliance and a user ID of the communications terminal. If the user authentication is successful, the communications terminal can function as a remote-control unit for controlling the electrical appliance on the basis of user operations.

According to the Japanese Unexamined Patent Application Publication No. 2005-3230701, the user performs an operation to specify an electrical appliance to be controlled using a communications terminal and, thereafter, inputs the type of operation to be performed by the electrical appliance as a request to the electrical appliance. In this manner, the user can control the external electrical appliance using the communications terminal.

In the above-described technology, it is troublesome for a user to perform an operation to specify an electrical appliance and, thereafter, perform an operation to specify a type of operation to be performed by the electrical appliance in order to control the electrical appliance. In addition, if there are a plurality of electrical appliances to be controlled, the user needs to select the electrical appliances a plurality of times, which makes the user operation more troublesome. Furthermore, large processing load is imposed on a device that receives such operations from the user and processes the input, which is problematic.

Accordingly, the present disclosure provides a control method of controlling an electrical appliance through a less number of operations.

A aspect of the present disclosure provides a system to send a request to an electrical appliance and set up the electrical appliance through a relatively simplified user operation using a mobile device, such as a cell phone or a smart phone.

To address such issues, according to an aspect of the present disclosure, a control method executed by a communications terminal, the control method including receiving setting information containing a first property and a setting of the first property, the first property representing a property of an operation performed by one or more target appliances to be controlled, obtaining correspondence information between device information identifying each of a plurality of the appliances and a second property, the second property representing a property of an operation performed by the appliance identified by the device information, extracting the device information items of one or more target appliances from among the device information items in the correspondence information, the device information items each having a second property that is the same as the first property contained in the setting information, generating a plurality of control information items each associated with each of the extracted device information items of one or more target appliances, containing the setting information and a predetermined information corresponding to the first property of the setting information and each of the device information items, receiving the device information regarding the target appliance from the target appliance through wireless communication, selecting, from among the generated control information items, the control information item indicating the operation performed by the target appliance identified by the received device information; and transmitting the selected control information item to the target appliance through wireless communication.

According to the control method, control information used for controlling an electrical appliance can be generated on the basis of the setting information set by a user, and the generated control information can be sent to a desired electrical appliance through short range wireless communication. The setting information is part of the control information that determines the operation performed by the electrical appliance. That is, the user can control the electrical appliance just as the user intended by simply specifying only part of the control information that determines the operation of the electrical appliance and, thereafter, performing a touch operation or a proximity operation for short range wireless communication. In this manner, the electrical appliance can be controlled by a less number of operations performed on the communications terminal.

In existing control methods, a user needs the following three stages:

(1) selecting the electrical appliance to be controlled by operating the communications terminal, (2) setting up a control item for the electrical appliance by operating the communications terminal, and (3) transmitting the setup control item to the electrical appliance using short range wireless communication between the communications terminal and the electrical appliance.

In contrast, according to the present disclosure, a user can control an electrical appliance through the following two stages:

(A) setting up part of the control item by operating the communications terminal, and (B) transmitting the setup part of the control item to the electrical appliance using short range wireless communication between the communications terminal and the electrical appliance. That is, according to the present disclosure, the user need not perform an operation to specify an electrical appliances using the communications terminal and, thus, the user can control the electrical appliance through a less number of operations on the communications terminal.

For example, obtaining correspondence information may include obtaining, as the correspondence information, a list stored in a storage unit of the communications terminal, and the list may indicate a correspondence between the device information and the second property.

In this manner, the communications terminal can obtain candidates of an electrical appliance to be controlled on the basis of the list stored in the communications terminal. Thus, the communications terminal alone can control the electrical appliance.

For example, the communications terminal may be capable of communicating with a server that stores a list indicating a correspondence between the device information and the second property. In obtaining correspondence information, the list stored in the server may be obtained as the correspondence information.

In this manner, the communications terminal can obtain candidates of an electrical appliance to be controlled on the basis of a list stored in a sever that can communicate with the communications terminal via a network. Thus, even a communications terminal having a limitation, such as a communications terminal having a limited storage area, can control an electrical appliance.

For example, the list may contain, as the device information, information used for uniquely identifying each of electrical appliances selected by the user.

In this manner, the communications terminal can control one of the electrical appliances that the user wants to control among the electrical appliances selected by the user in advance.

For example, receiving setting information may include receiving the setting information using voice uttered from a user.

In this manner, the communications terminal can obtain the setting information through user's voice. The user can input the setting information to the communications terminal by the voice without using a key operation performed on the communications terminal and a touch screen operation. Accordingly, the operation performed by the user is simplified and is user-friendly.

For example, the short range wireless communication may be started by a touch operation in which the user causes the communications terminal and the electrical appliance to touch together, and the short range wireless communication performed in receiving the device information and the short range wireless communication performed in transmitting the selected control information item may be performed by the touch operation performed only once.

In this manner, appropriate control information can be transmit from the communications terminal to the electrical appliance by a single touch operation. Accordingly, the user can control the electrical appliance using the communications terminal with less number of operations.

For example, receiving setting information may include presenting information for prompting the user to input setting information and receiving, as the setting information, the setting information input by the user in accordance with the presented information.

In this manner, the user can be aware that the setting information can be input to the communications terminal. The user can view the information for prompting input of the setting information and input the setting information to the communications terminal by following the prompt information.

For example, each of the first property and the second property may include at least one of a point in time at which the target appliance starts to operate, a temperature regarding the operation performed by the target appliance, a time length of the operation performed by the target appliance, the intensity of the operation performed by the target appliance, and on/off of the operation performed by the target appliance.

In this manner, the user can appropriately control a variety of properties of the operation performed by an electrical appliance.

According to another embodiment of the disclosure, a communications terminal including a first receiver that receive setting information containing a first property and a setting of the first property, the first property representing a property of an operation performed by one or more target appliance to be controlled, an obtainer that obtain correspondence information between device information identifying each of a plurality of the appliances and a second property, the second property representing a property of an operation performed by the appliance identified by the device information, an extractor that extract the device information items of one or more target appliances from among the device information items in the correspondence information, the device information items each having a second property that is the same as the first property contained in the setting information, a generator that generate a plurality of control information items each associated with each of the extracted device information items of one or more target appliances, containing the setting information and a predetermined information corresponding to the first property of the setting information and each of the device information items, a second receiver that receive the device information regarding the target appliance through wireless communication from the target appliance, a selector that select, from among the generated control information items, the control information item indicating the operation performed by the appliance identified by the received device information, and a transmitter that transmits the selected control information item to the target appliance through wireless communication to the target appliance, wherein at least one of the first receiver, the obtainer, the generator, the second receiver, the selector, the transmitter, and the transmitter is included in a processor.

According to the communications terminal, advantages that are the same as the above-described advantages can be provided.

According to another embodiment of the disclosure, a control system including a communications terminal and one or more target appliances, the communications terminal including a first receiver that receive setting information containing a first property and a setting of the first property, the first property representing a property of an operation performed by one or more target appliance to be controlled, an obtainer that obtain correspondence information between device information identifying each of a plurality of the appliances and a second property, the second property representing a property of an operation performed by the appliance identified by the device information, an extractor that extract the device information items of one or more target appliances from among the device information items in the correspondence information, the device information items each having a second property that is the same as the first property contained in the setting information, a generator that generate a plurality of control information items each associated with each of the extracted device information items of one or more target appliances, containing the setting information and a predetermined information corresponding to the first property of the setting information and each of the device information items, a second receiver that receive the device information regarding the target appliance through wireless communication from the target appliance, a selector that select, from among the generated control information items, the control information item indicating the operation performed by the appliance identified by the received device information, and a transmitter that transmits the selected control information item to the target appliance through wireless communication to the target appliance, wherein at least one of the first receiver, the obtainer, the generator, the second receiver, the selector, the transmitter, and the transmitter is included in a processor.

According to the control system, advantages that are the same as the above-described advantages can be provided.

The above-described collective embodiments and particular embodiments may be realized by a system, a method, an integrated circuit, a computer program, a computer readable recording medium, such as a compact disc read only memory (CD-ROM), or any combination of a system, a method, an integrated circuit, a computer program, and a computer readable recording medium.

Exemplary embodiments are described in detail below with reference to the accompanying drawings.

It should be noted that each of the following embodiments indicates a collective or particular example. The values, shapes, materials, components, the arrangement positions and the connection configuration of the components, steps, and the order of the steps in the following embodiments are only examples, and it should not be construed that the technical scope of the disclosure is limited thereto. In addition, among components appearing in the following embodiments, a component that is not defined in an independent claim that describes the most superordinate concept is an optional component of the disclosure.

First Exemplary Embodiment

According to the present exemplary embodiment, a system including an electrical appliance having a short range wireless communication function and a communications terminal also having a short range wireless communication function is described. In the system, a user controls the electrical appliance using the communications terminal by sending a request to the electrical appliance and setting up the electrical appliance through a relatively simplified operation. Note that in the following descriptions, the electrical appliance to be controlled is also referred to as a "target appliance".

FIG. 1 is a schematic illustration of the overview of a communication system 100 according to the present exemplary embodiment. As illustrated in FIG. 1, the communication system 100 includes an electrical appliance 10 and a communications terminal 20.

The electrical appliance 10 is a device that operates while consuming electrical power. The electrical appliance 10 can communicate with the communications terminal 20 through short range wireless communication. Examples of the electrical appliance 10 include a cooking range, a rice cooker, an induction heating (IH) cooking heater, a refrigerator, a washing machine, a sphygmomanometer, a body composition meter, an active meter, a television set, a digital camera, and a digital versatile disc (DVD) recorder.

The communications terminal 20 is connected to a communication network. The communications terminal 20 can communicate with a variety of servers and terminals connected to the communication network. In addition, the communications terminal 20 can communicate with the electrical appliance 10 through short range wireless communication. Examples of the communications terminal 20 include a cell phone and a smart phone (also referred to as a "high-performance cell phone" or a "multi-functional cell phone").

The electrical appliance 10 and the communications terminal 20 can communicate with each other through short range wireless communication. As used herein, the term "short range wireless communication" refers to (1) communication between a radio frequency identification (RFID) tag and a reader/writer device using electromagnetic induction in 13.56 MHz frequency band (the HF band) or a radio wave in 52 to 954 MHz band (the UHF band) or (2) near field communication (NFC) in 13.56 MHz frequency band. Note that RFID is standardized as ISO 14443, and NFC is standardized as ISO/IEC 21481. The communication range of the short range wireless communication is limited to several tens centimeters for the HF band and several centimeters in the UHF band. Accordingly, when a communications terminal is moved close to an electrical appliance so that the distance between the communications terminal and the electrical appliance is within the above-described range, the short range wireless communication is performed. More specifically, when a proximity operation in which a user brings the communications terminal and the electrical appliance into proximity or a touch operation in which the user causes the communications terminal and the electrical appliance to touch together is performed, communication between the communications terminal and the electrical appliance is performed.

According to the present exemplary embodiment, a configuration in which the communications terminal 20 has a reader/writer function implemented therein and the electrical appliance 10 has an IC tag function implemented therein is described. Note that according to the present exemplary embodiment, any configuration in which the electrical appliance 10 and the communications terminal 20 can communicate with each other through short range wireless communication may be employed. That is, the communications terminal 20 may have the IC tag function, and the electrical appliance 10 may have the reader/writer function. Note that in NFC, a P-to-P communication, card emulation, and reader/writer emulation are standardized. In such a case, a relationship between an IC tag and a reader/writer device may be reversed. For ease of description, according to the present exemplary embodiment, the communications terminal 20 has a reader/writer function implemented therein, and the electrical appliance 10 has the IC tag function implemented therein.

Figure 2:
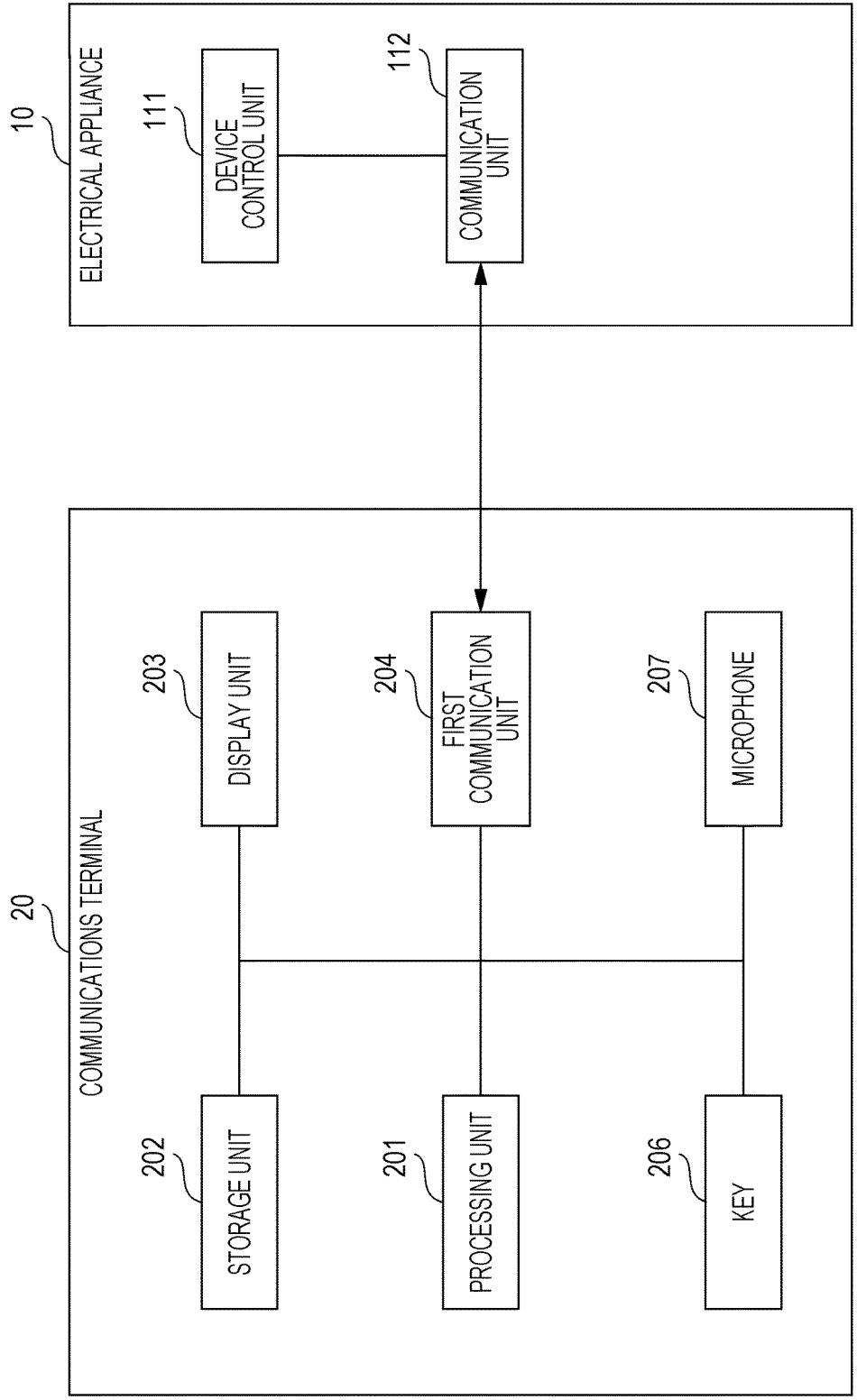
FIG. 2 is a block diagram of the hardware configuration of a communications terminal and an electrical appliance according to the first exemplary embodiment.

FIG. 2 is a block diagram of the hardware configuration of a communications terminal and an electrical appliance according to the present exemplary embodiment.

As illustrated in FIG. 2, the electrical appliance 10 includes a device control unit 111 and a communication unit 112.

The device control unit 111 controls the operation performed by an electrical appliance. More specifically, the device control unit 111 controls the operation performed by the electrical appliance 10 on the basis of communication with the communication unit 112. For example, if the electrical appliance 10 is a cooking range, the properties of the operation include an output time of a microwave (a heating time), the output power, and start and end of outputting the microwave. In addition, if the electrical appliance 10 is a rice cooker, the properties of the operation include a rice cooked time, the type of rice being cooked, and start and end of cooking rice.

The communication unit 112 performs short range wireless communication with the reader/writer device included in the communications terminal 20. The communication unit 112 modulates data transmitted to the reader/writer device and demodulates data received from the reader/writer device. In addition, the communication unit 112 generates power for at least establishing the short range wireless communication on the basis of a radio wave received from the reader/writer device and extracts a clock signal on the basis of radio wave transmitted from the reader/writer device. Thereafter, the communication unit 112 operates on the basis of the power generated from the radio wave and the clock transmitted from the reader/writer device. In this manner, even when the main power of the electrical appliance 10 is turned off, the communication unit 112 can perform short range wireless communication with the communications terminal 20. Note that as described above, a functional block of the electrical appliance 10 other than the communication unit 112 may operate using the power generated by the radio wave transmitted from the reader/writer device. Alternatively, the functional block may not operate using the power generated by the radio wave transmitted from the reader/writer device (that is, the functional block may operate other power and clock).

The communication unit 112 further includes a loop antenna for short range wireless communication with the reader/writer device included in the communications terminal 20.

The communications terminal 20 includes a processing unit 201, a storage unit 202, a display unit 203, a first communication unit 204, a key 206, and a microphone 207.

An example of the processing unit 201 is a processor that performs processing in the communications terminal 20. For example, the processing unit 201 is formed from a central processing unit (CPU). The processing unit 201 further includes a random access memory (RAM) or a read only memory (ROM) as needed.

The storage unit 202 is a memory storing a device list.

The display unit 203 displays the result of short range wireless communication between the communications terminal 20 and the electrical appliance 10 and data transmitted from a server apparatus 104. An example of the display unit 203 is a liquid crystal display.

The first communication unit 204 serves as a communication interface for the short range wireless communication. The first communication unit 204 includes an antenna for short range wireless communication. The first communication unit 204 performs polling of IC tags of the electrical appliances 10. After communication is established, the first communication unit 204 reads information from the electrical appliance 10 and writes information to the electrical appliance 10.

The first communication unit 204 is started in response to key input to the key 206 or sound input to the microphone 207 from a user. After starting, the first communication unit 204 performs a polling operation on the electrical appliances 10 via short range wireless communication. In general, to perform polling, the first communication unit 204 continues to emit a radio wave to unspecified communication partners. Accordingly, if the communications terminal 20 is battery operated, the charge amount of the battery decreases. To address such an issue, a dedicated button to start polling can be provided in the communications terminal 20. In this manner, a wasted polling operation can be prevented. In addition, the operation performed by the user to operate the device can be eased.

The key 206 is a user interface to receive key input from the user. Upon being physically pressed, the key 206 receives a predetermined character or symbol. Alternatively, if the display unit 203 is a touch panel, the key 206 may be overlaid on the display unit 203.

The microphone 207 is a device to receive voice uttered from the user.

Through such a system configuration, the system in which the user transmits a request to the electrical appliance 10 and sets up the electrical appliance 10 by inputting a request for the electrical appliance 10 to the communications terminal 20 and, thereafter, causing the communications terminal 20 and the electrical appliance 10 to perform short range wireless communication.

Figure 3:
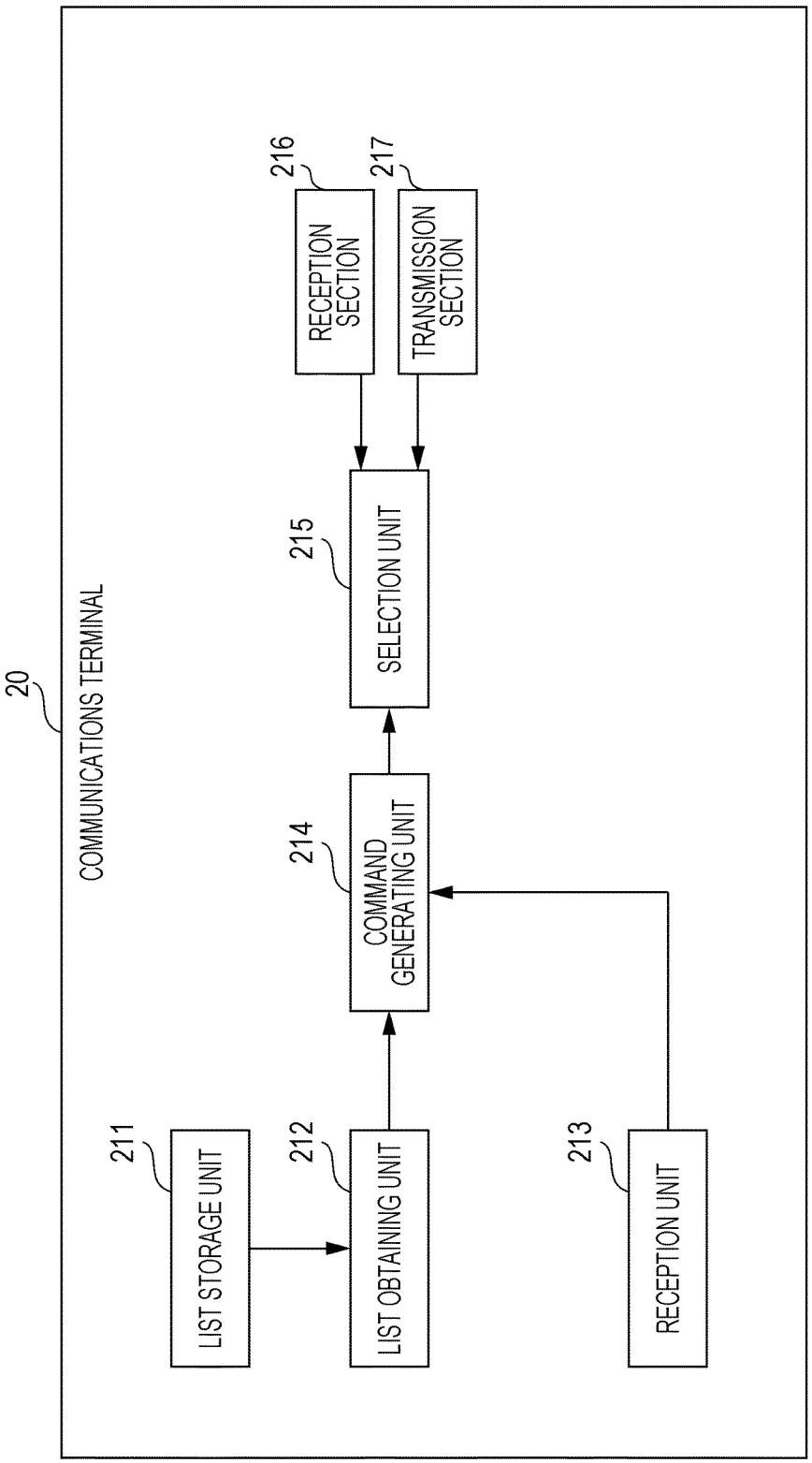
FIG. 3 is a block diagram of the functional configuration of the communications terminal according to the first exemplary embodiment.

FIG. 3 is a block diagram of the functional configuration of the communications terminal 20 according to the present exemplary embodiment.

As illustrated in FIG. 3, the communications terminal 20 includes the list storage unit 211, a list obtaining unit 212, a reception unit 213, a command generating unit 214, a selection unit 215, a reception section 216, and a transmission section 217.

The list storage unit 211 stores a list of electrical appliances that can be controlled by the communications terminal (hereinafter referred to as a "device list"). The device list indicates a correspondence between device information used for identifying an electrical appliance and the properties of the operation performed by the electrical appliance. The device list is described in more detail below. Note that the list storage unit 211 corresponds to a storage unit.

The list obtaining unit 212 obtains correspondence information between the device information used for identifying each of a plurality of electrical appliances including a target appliance and a second property, which is a property of the operation that can be performed by the electrical appliance identified by the device information. Since the correspondence information is stored in the list storage unit 211, the list obtaining unit 212 obtains the device list from the list storage unit 211. In addition, the list obtaining unit 212 extracts, from among rows of the electrical appliances indicated by the acquired device list, a row of the electrical appliance having a property of the operation that is the same as the property contained in setting information received from the user via the reception unit 213. Thus, the list obtaining unit 212 generates an extracted list from the extracted rows. Note that the list obtaining unit 212 corresponds to an obtaining unit.

Note that the list obtaining unit 212 may obtain, as a list indicating the above-described correspondence, a correspondence list stored in a storage unit of the communications terminal 20.

The reception unit 213 receives setting information. The setting information includes a first property representing a property of the operation performed by the target appliance (the electrical appliance to be controlled) under user control and a set value for the first property. Hereinafter, the term "first property" is also simply referred to as a "property". The reception unit 213 may receive the setting information from the user or an appropriate external apparatus. The reception unit 213 may receive the setting information by obtaining voice emanating from the user. Before receiving the setting information in the above-described manner, the reception unit 213 may present information prompting the input of the setting information to the user and receive, as the setting information, setting information input by the user in accordance with the presented information.

The command generating unit 214 selects, from among the device information items of the electrical appliances in the received correspondence information, the device information items of the electrical appliances each having a second property that is the same as the first property contained in the received setting information. Thereafter, the command generating unit 214 adds, to the setting information received by the reception unit 213, the first property and a predetermined information item corresponding to each of the device information items. In this manner, the command generating unit 214 generates a plurality of control information items each indicating a control item for one of the selected electrical appliances. More specifically, the command generating unit 214 selects, from among the electrical appliances listed in the device list obtained by the list obtaining unit 212, an electrical appliance having a property that is the same as the property contained in the setting information received from, for example, the user via the reception unit 213. Thereafter, the command generating unit 214 generates a command (control information item) for each of the selected electrical appliances by adding predetermined information corresponding to the electrical appliance. A list of the selected electrical appliances in the above-described manner is referred to as an "extracted list". The extracted list is described in more detail below. Note that the command generating unit 214 corresponds to a generating unit.

The selection unit 215 selects, from among the plurality of the control information items generated by the command generating unit 214, the control information item indicating how control is performed on the electrical appliance identified by the received device information. That is, the selection unit 215 selects, from among the commands generated by the command generating unit 214, the command for the electrical appliance having a device ID that is the same as that received from the target appliance by the reception section 216.

The reception section 216 receives the device information regarding the target appliance through short range wireless communication between the target appliance and the communications terminal 20. That is, the reception section 216 receives the device ID of the target appliance from the electrical appliance 10.

The transmission section 217 transmits the control information item selected by the selection unit 215 to the target appliance through short range wireless communication between the target appliance and the communications terminal 20.

Through the above-described configuration, commands each corresponding to the setting information input to the communications terminal 20 by the user can be generated using the device list stored in the list storage unit.

Thereafter, one of the commands for the electrical appliance 10 (the target appliance) can be selected and transmitted to the electrical appliance 10 by the communications terminal 20. In this manner, setup of the target device can be made.

Figure 4:
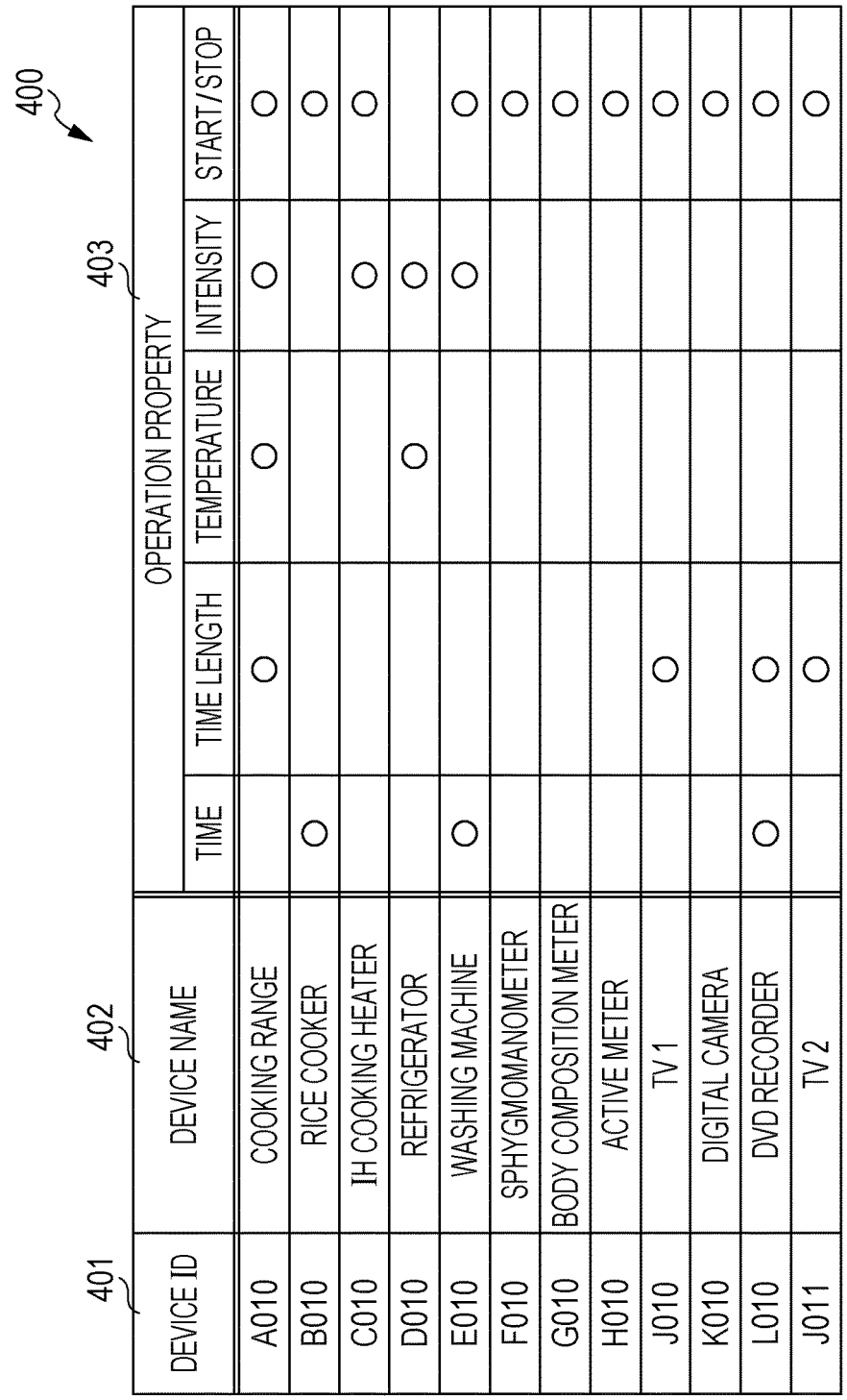
FIG. 4 illustrates a device list stored in a list storage unit according to the first exemplary embodiment.

FIG. 4 illustrates the device list stored in the list storage unit according to the present exemplary embodiment. As illustrated in FIG. 4, a device list 400 contains a device ID 401, a device name 402, and an operation property 403, where each of the device name 402 and the operation property 403 is associated with the device ID 401.

The device ID 401 is device information used for uniquely identifying an electrical appliance. The device ID may be a part number of the electrical appliance or a manufacturing number (a serial number) of the electrical appliance. Note that a plurality of electrical appliances do not have the same device ID 401.

The device name 402 is the name of an appliance identified by the device ID 401. Note that a plurality of electrical appliances may have the same name. For example, a device list containing information regarding two television sets may have two rows each including the device-name-402 field containing "TV". In such a case, to identify each of the two television sets, a unique alphanumeric character or symbol may be appended to the name. For example, the device list illustrated in FIG. 4 contains information regarding two television sets, and a unique number is appended to each of the device names of the television sets so that the device names are "TV1" and "TV2". In this manner, each of the television sets can be uniquely identified.

The operation property 403 indicates the property of the operation performed by an appliance identified by the device ID 401. The property of the operation describes the type of operation performed by an electrical appliance. The operation performed by the electrical appliance has a variety of properties. Example of the properties include a time, a time length, a temperature, an intensity, and START/STOP. An operation having a "time" property allows a user to set up so the operation is to be performed at a predetermined point in time or is to be completed before a predetermined point in time. For example, a rice cooker needs to complete cooking rice at a predetermined point in time, a washing machine needs to complete washing clothes at a predetermined point in time, and a DVD recorder needs to start recording at a predetermined point in time. Similarly, an operation having a "time length" property allows the user to set up so that the electrical appliance continues to perform the operation for a predetermined period of time or starts the operation at a time after a predetermined time length elapses from a preset time. An operation having an "intensity" property allows the user to set up so that if the intensity of the operation or the effect of the operation can be defined for the electrical appliance, the operation is performed at a predetermined intensity or at an intensity higher than a preset intensity. An operation having a "START/STOP" property allows the user to set up so that the operation performed by an electrical appliance can be started and stopped (completed).

Note that an electrical appliance may have a plurality of operation properties. For example, as illustrated in FIG. 4, the following operation properties: a time, a time length, and START/STOP can be set for a DVD recorder. If the user instructs a DVD recorder to start recording from a desired point in time and continue the recording for a desired time length, both the time property and the time length property are specified.

FIG. 5 illustrates the extracted list according to the present exemplary embodiment. As illustrated in FIG. 5, an extracted list 500 contains a device name 502 and an operation property 503 each associated with a device ID 501. The rows of only the electrical appliances having a "time" operation property are extracted from the device list illustrated in FIG. 4 and are set in the extracted list 500 in FIG. 5.

Figure 6:
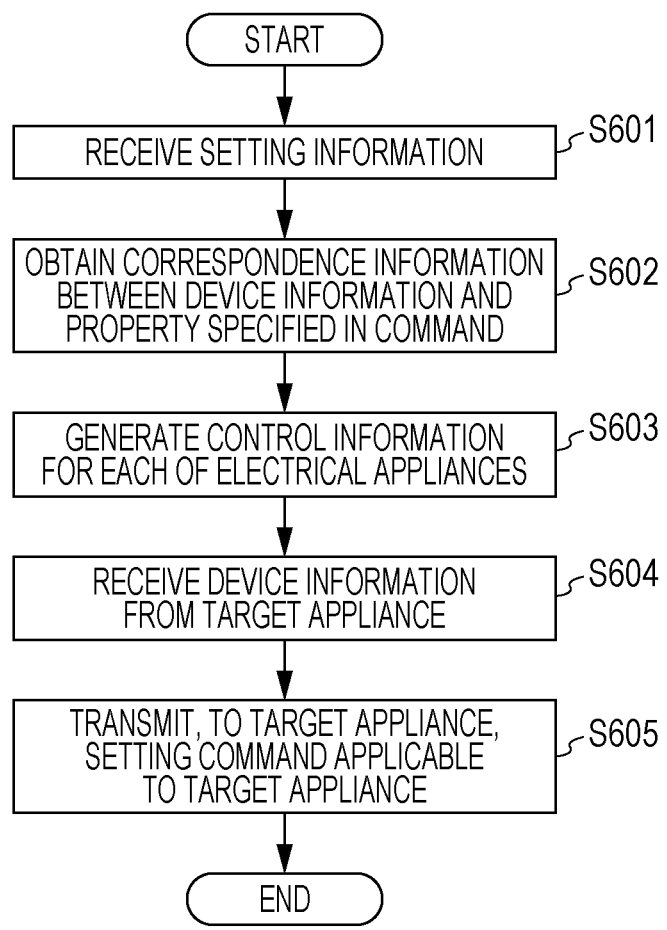
FIG. 6 is a flowchart of the operation performed by the communications terminal according to the first exemplary embodiment.
Figure 7:
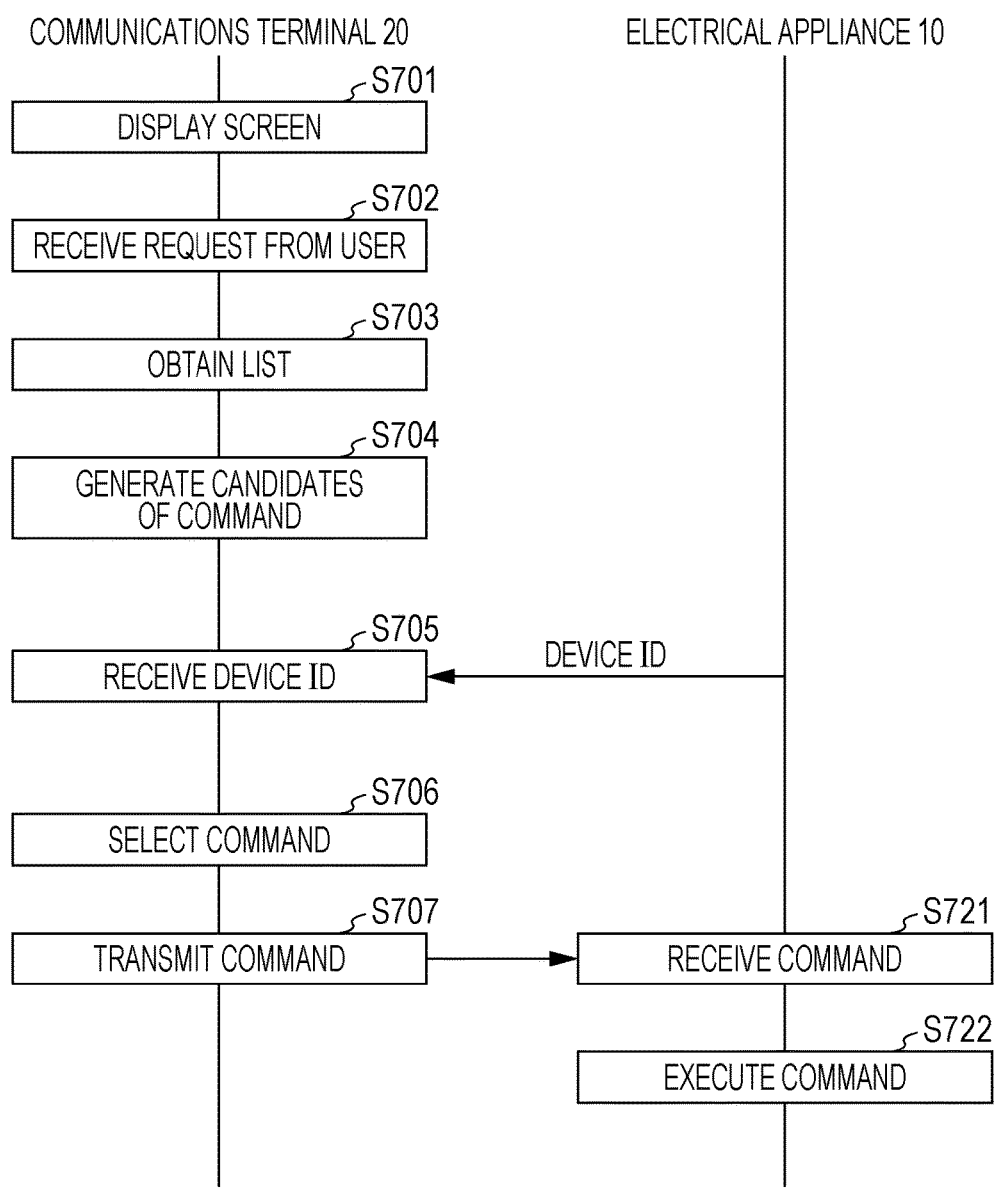
FIG. 7 is a sequence diagram illustrating the processing flow when the communications terminal sends a user's request to an electrical appliance to be controlled according to the first exemplary embodiment.

FIG. 6 is a flowchart of the operation performed by the communications terminal according to the present exemplary embodiment. FIG. 7 is a sequence diagram illustrating the processing flow when the communications terminal sends a user's request to the target appliance according to the first exemplary embodiment. The operation performed by the communications terminal 20 and exchange of data between the electrical appliance 10 and the communications terminal 20 are described with reference to FIGS. 6 and 7.

In step S601 (S702), the reception unit 213 receives setting information from the user. Before receiving the setting information, the reception unit 213 may display, on the display unit 203, a screen for prompting the user to input the setting information (step S701). In this manner, by viewing the screen, the user can input the setting information to the communications terminal using the screen.

In step S602 (S703), the list obtaining unit 212 obtains the extracted list (the correspondence) stored in the list storage unit 211 on the basis of the setting information received as a user's request. The extracted list is formed from rows that are extracted from the device list and that include the information regarding the electrical appliances having an operation property that is the same as that included in the setting information. The list storage unit 211 stores the device list describing a correspondence between the information regarding an electrical appliance and a device ID (refer to FIG. 4). The list storage unit 211 may prestore a list of electrical appliances used by the user. The electrical appliance corresponding to the request may be one of the electrical appliances in the list of electrical appliances used by the user (refer to FIG. 5). In addition, the device list may be a device list of electrical appliances specified by the user in advance.

In step S603 (S704), the command generating unit 214 generates a candidate of a command for each of the electrical appliances 10 listed in the obtained extracted list.

In step S604 (S705), the reception section 216 receives the device ID from the electrical appliance 10 to be controlled through short range wireless communication. The short range wireless communication is performed by a proximity operation in which the user brings the communications terminal 20 and the electrical appliance 10 into proximity or a touch operation in which the user causes the communications terminal 10 and the electrical appliance 20 to touch together.

In step S605, the transmission section 217 transmits the command to the target appliance through short range wireless communication. More specifically, the selection unit 215 selects the command for the electrical appliance corresponding to the obtained device ID first (step S706). Thereafter, the transmission section 217 transmits the command selected by the selection unit 215 to the electrical appliance 10 to be controlled through short range wireless communication (step S707).

Subsequently, the electrical appliance 10 receives the command transmitted from the communications terminal 20 in step S603 (step S721) and operates by executing the command (step S722).

Note that both the short range wireless communication in step S604 and the short range wireless communication in step S605 may be performed in response to a single touch operation or proximity operation performed by the user. In this manner, the communications terminal 20 can transmit appropriate control information to the electrical appliance 10 through a single touch operation or proximity operation performed by the user.

Note that when in step S605, the number of candidates of the command is only one and if the communications terminal 20 can communicate with the electrical appliance 10 using a communication technique other than short range wireless communication (e.g., a wireless LAN based on IEEE 802.11a, 802.11b, 802.11g, or 802.11n), the command may be transmitted to the electrical appliance 10 using the communication technique instead of using the short range wireless communication.

According to the present exemplary embodiment, the command is not limited to a single control command. For example, a command may be a program including a plurality of control commands.

FIG. 8 illustrates a control method according to the present exemplary embodiment. The control method according to the present exemplary embodiment is described below with reference to FIG. 8.

In this example, a user inputs "8 o'clock" as the setting information. In addition, the list storage unit 211 prestores the device list 400 illustrated in FIG. 4.

The reception unit 213 receives "8 o'clock" as setting information 801 first (step S601). As can be seen from the information "8 o'clock", the setting information 801 indicates that the operation has a "time" property and the set value of the property is "8 (o'clock)".

Subsequently, the list obtaining unit 212 obtains the device list 400 stored in the list storage unit 211 (step S602). Thereafter, the list obtaining unit 212 extracts the information regarding the electrical appliances having the "time" operation property and generates the extracted list 500. Thus, three electrical appliances, that is, a rice cooker, a washing machine, and a DVD recorder are listed in the extracted list 500.

Subsequently, the command generating unit 214 generates a command (control information) for each of the three electrical appliances (step S603). That is, the command generating unit 214 generates control information 811 indicating that "cooking is to be completed at 8 o'clock" for the rice cooker, control information 812 indicating that "washing is to be completed at 8 o'clock" for the washing machine, and control information 813 indicating that "video recording is to be started at 8 o'clock" for the DVD recorder.

Subsequently, the user moves the communications terminal 20 close to the rice cooker (i.e., the electrical appliance 10) (the user performs a touch operation). Thus, the communications terminal 20 and the electrical appliance 10 perform short range wireless communication with each other. Through the short range wireless communication, the communications terminal 20 obtains the device ID of the rice cooker (i.e., the electrical appliance) first (step S604). Note that as illustrated in FIG. 4 or 5, the device ID of the rice cooker is "B010".

Subsequently, the communications terminal 20 selects the control information 811 for the electrical appliance identified by the device ID (i.e., the rice cooker). Thereafter, the communications terminal 20 transmits the control information 811 to the electrical appliance 10 through short range wireless communication (step S605).

Note that when a command corresponding to each of the electrical appliances is generated in step S603, information predetermined for the electrical appliances is appended to the setting information. In this manner, the command is generated. For example, in the case of the rice cooker, the information indicating that "cooking is completed (at the point in time)" is appended to the setting information having a time property. Thus, the command 821 is generated. Note that the information appended above may be a default setting or a favorite setting preset for the electrical appliance by the user.

Note that if no property is specified, it can be predetermined which property corresponds to the setting information. In this manner, the setting information having no specification of a property can be accepted. For example, when "8" is received as the setting information without specification of a property and if it is predetermined that a default property is the time property, the setting information "8" is considered as "8 o'clock". Thus, the subsequent processing can be performed.

Through the above-described configuration, the user need not select an electrical appliance to be controlled using the communications terminal. In addition, by simply holding the communications terminal over the electrical appliance to be controlled after inputting a request to the communications terminal, the user can control the electrical appliance.

Second Exemplary Embodiment

According to a second exemplary embodiment, a communication system including an electrical appliance having a short range wireless communication function, a communications terminal that performs short range wireless communication with the electrical appliance, and a server connected to the communications terminal via a general-purpose network, such as the Internet or a mobile phone communication network, is described below. By using the communication system, a user can transmit a request to an electrical appliance via a cell phone or a smart phone with a relatively simplified operation so as to set up the electrical appliance. The communication system is described in detail below with reference to the accompanying drawings. Note that the same numbering will be used in describing a component as was utilized above in describing the first exemplary embodiment, and description of the component is not repeated, where appropriate.

FIG. 9A is a schematic illustration of the overview of the communication system according to the present exemplary embodiment. As illustrated in FIG. 6, a communication system 101 includes an electrical appliance 10, a communications terminal 21, and a server 40. Note that the communications terminal 21 and the server 40 are collectively referred to as a "control system 50" as needed.

The communications terminal 21 controls the electrical appliance 10 in cooperation with the server 40 in the same manner as in the communications terminal 20 of the first exemplary embodiment.

The server 40 incorporates a database. The server 40 is connected to the communications terminal 21 via a network 30. The server 40 registers information sent from the communications terminal 21 in the database and sends back information indicating the result of registration to the communications terminal 21. For example, the server 40 is formed from a WEB server with a database.

Through such a system configuration, a system by which a user can transmit a request to the electrical appliance 10 and set up the electrical appliance 10 by inputting the request to the communications terminal 21 and causing the communications terminal 21 to perform short range wireless communication with the electrical appliance 10 can be provided.

Figure 9B:
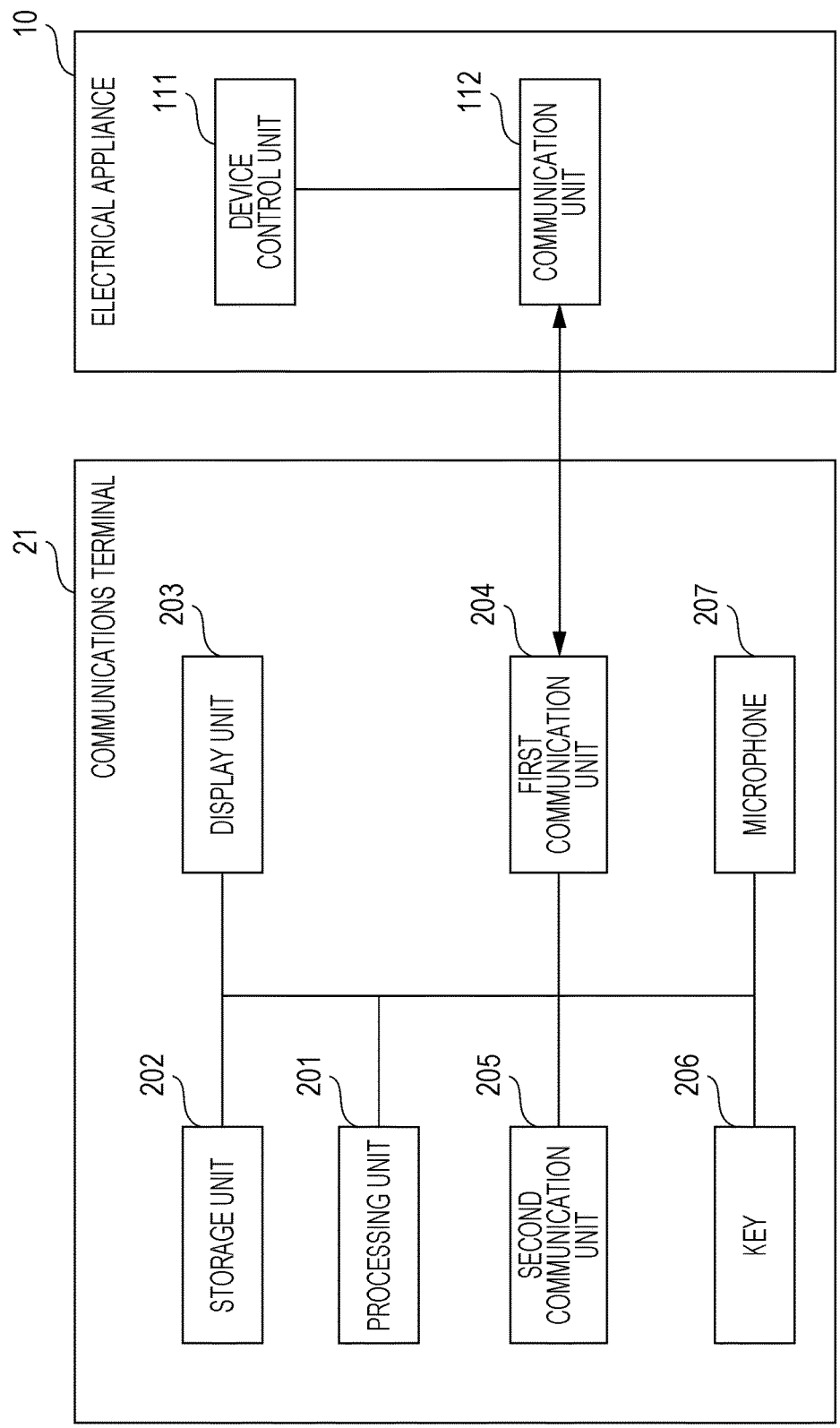
FIG. 9B is a block diagram of the hardware configuration of a communications terminal and an electrical appliance according to the second exemplary embodiment.

FIG. 9B is a block diagram of the hardware configuration of a communications terminal and an electrical appliance according to the present exemplary embodiment. An electrical appliance 10 has a configuration similar to that of the electrical appliance 10 according to the first exemplary embodiment.

A communications terminal 20 includes a processing unit 201, a storage unit 202, a display unit 203, a first communication unit 204, a second communication unit 205, a key 206, and a microphone 207.

The second communication unit 205 is a communication interface capable of being connected to a general-purpose network, such as a LAN or a mobile phone communication network. The second communication unit 205 communicates with the server 40 via the network under the control of, for example, the processing unit 201.

The communications terminal 21 and the server 40 are described in detail below with reference to the accompanying drawings.

FIG. 10 is a block diagram of the configuration of the communications terminal 21 and the server 40 according to the present exemplary embodiment.

The communications terminal 21 includes a reception unit 213, a selection unit 215A, a reception section 216, and a transmission section 217.

The selection unit 215A selects, from among a plurality of commands generated by a command generating unit 414 of the server 40, the command for an electrical appliance having a device ID that is the same as that received from the target appliance by the reception section 216.

Note that the selection unit 215 according to the first exemplary embodiment selects a command from among the commands generated by the command generating unit 214. In contrast, the selection unit 215A selects a command from among the commands generated by the command generating unit 414 of the server 40. As described above, the present exemplary embodiment differs from the first exemplary embodiment.

The reception unit 213, the reception section 216, the transmission section 217 are the same as those of the first exemplary embodiment illustrated in FIG. 3.

The server 40 includes a list storage unit 411, a list obtaining unit 412, and the command generating unit 414.

The list storage unit 411 stores a device list regarding electrical appliances that can be controlled by the control system 50.

The list obtaining unit 412 obtains the device list from the list storage unit 411.

The command generating unit 414 selects, from among the electrical appliances listed in the list obtained by the list obtaining unit 412, the electrical appliances that are likely to satisfy the request input by the user via the communications terminal 21. Thereafter, the command generating unit 414 generates a candidate of a command for each of the selected electrical appliances.

Through the above-described configuration, commands for the request input to the communications terminal 21 by the user can be generated from the device list stored in the server 40.

In addition, one of the commands for the electrical appliance 10 to be controlled can be selected using the communications terminal 21. Thus, the command can be transmitted to the electrical appliance 10 to set up the electrical appliance 10.

Figure 11:
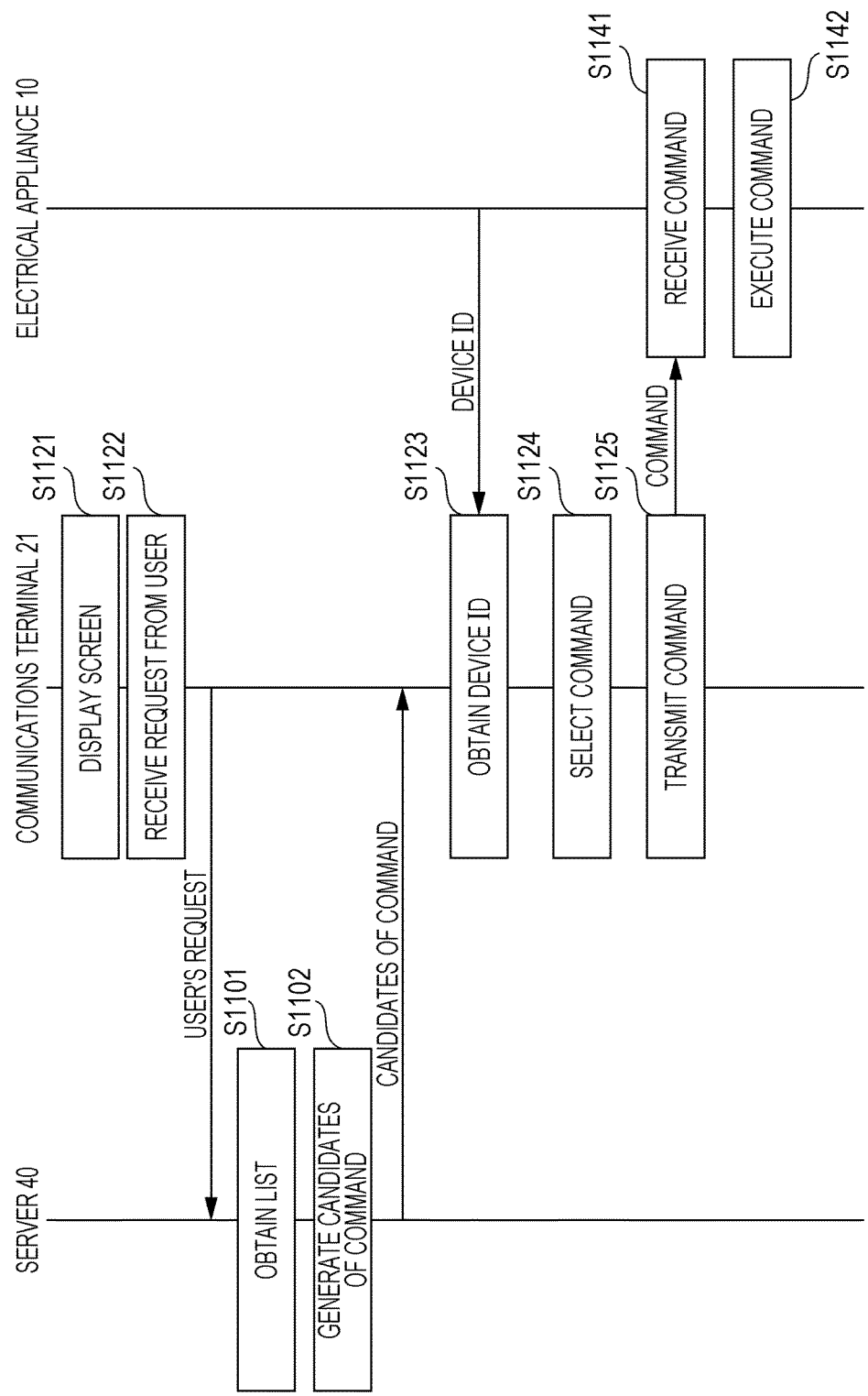
FIG. 11 is a sequence diagram illustrating the processing flow when a user's request is sent to an electrical appliance to be controlled using a communications terminal and a server according to the second exemplary embodiment.

Exchange of data among the electrical appliance 10, the communications terminal 21, and the server 40 performed when the communications terminal 21 according to the present exemplary embodiment controls the electrical appliance 10 is described below with reference to FIG. 11.

The process in step S1121 is the same as that in step S701 of the first exemplary embodiment (refer to FIG. 7).

In step S1122, the communications terminal 21 receives a request input by the user. Thereafter, the communications terminal 21 transmits the request received from the user to the server 40 via the network 30.

In step S1101, upon receiving the request input by the user, the list obtaining unit 412 obtains the device list from the list storage unit 411 and generates a list of the electrical appliances corresponding to the request (i.e., an extracted list). The extracted list is similar to that of the first exemplary embodiment illustrated in FIG. 3.

In step S1102, the server 40 generates a candidate of a command for each of the electrical appliances 10 listed in the obtained extracted list and sends the candidates to the communications terminal 21. The communications terminal 21 receives the candidates of a command transmitted from the server 40.

The processes in steps S1123 to S1125 and steps S1141 and S1142 are the same as those in steps S705 to S707 and steps S721 and S722 of the first exemplary embodiment (refer to FIG. 7), respectively.

In the above-described configuration, since the server 40 includes the list storage unit 411, the list obtaining unit 412, and the command generating unit 414, the system is less vulnerable to external attack than the configuration in which the list storage unit 411, the list obtaining unit 412, and the command generating unit 414 are included in a communications terminal. In this manner, electrical appliance information and a control command in response to a request can be generated more safely.

Third Exemplary Embodiment

According to a third exemplary embodiment, a communications terminal includes the list obtaining unit. The other system configurations are the same as those of the second exemplary embodiment. Note that the same numbering will be used in describing a component as was utilized above in describing the exemplary embodiments, and description of the component is not repeated, where appropriate.

A communication system 101 is the same as that of the first exemplary embodiment.

A communications terminal 22 and a server 41 according to the present exemplary embodiment are described in detail below with reference to the accompanying drawings.

Figure 12:
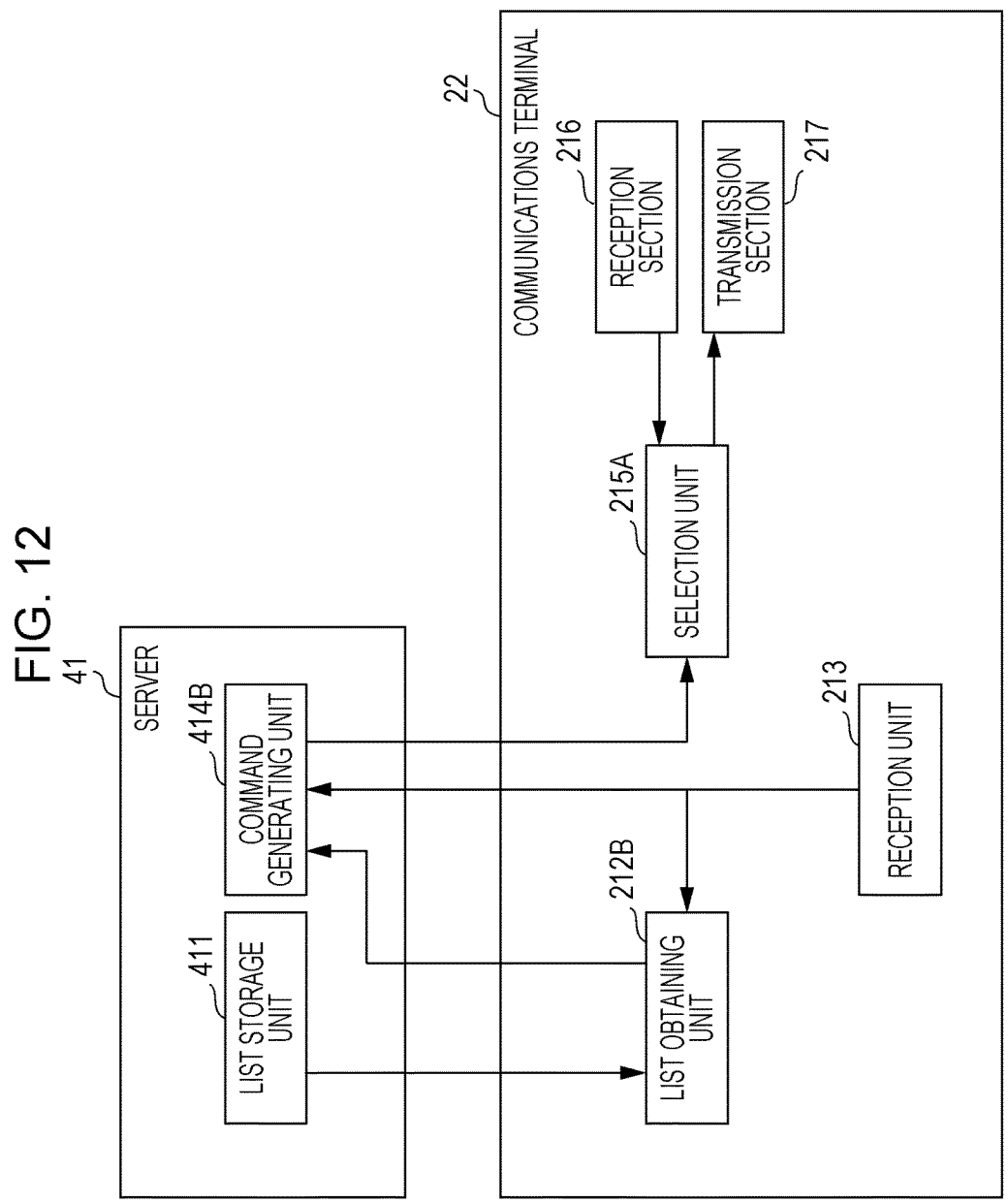
FIG. 12 is a block diagram of the functional configurations of a communications terminal and a server according to a third exemplary embodiment.

FIG. 12 is a block diagram of the configurations of the communications terminal 22 and the server 41 according to the present exemplary embodiment.

The communications terminal 22 includes a list obtaining unit 212B, a reception unit 213B, a selection unit 215A, a reception section 216, and a transmission section 217.

The list obtaining unit 212B obtains a device list stored in the list storage unit 411B of the server 40. In addition, the list obtaining unit 212B generates an extracted list by extracting, from the obtained device list, information items regarding the electrical appliances that can satisfy the user's request. Thereafter, the communications terminal 22 requests the server 41 to generate a command corresponding to each of the electrical appliances in the extracted list.

The reception unit 213, the selection unit 215A, the reception section 216, and the transmission section 217 are the same as those of the second exemplary embodiment (refer to FIG. 10).

The server 41 includes a list storage unit 411B and a command generating unit 414B.

A list storage unit 411 is the same as that of the second exemplary embodiment (refer to FIG. 10).

The command generating unit 414B selects, from among the electrical appliances listed in the list obtained by the list obtaining unit 212B, the electrical appliances that are likely to satisfy the request input by the user via the communications terminal 22 and generates a candidates of a command for each of the electrical appliances. In the second exemplary embodiment (refer to FIG. 12), the command generating unit 414 obtains information from the list obtaining unit 412. According to the present exemplary embodiment, unlike the command generating unit 414, the command generating unit 414B obtains the information from the list obtaining unit 212B.

Through the above-described configuration, commands for the request input to the communications terminal 22 by the user can be generated from the device list stored in the server 41.

In addition, the command for the electrical appliance 10 to be controlled can be selected by the communications terminal 22. Thus, the command can be transmitted to the electrical appliance 10 to set up the electrical appliance 10.

Figure 13:
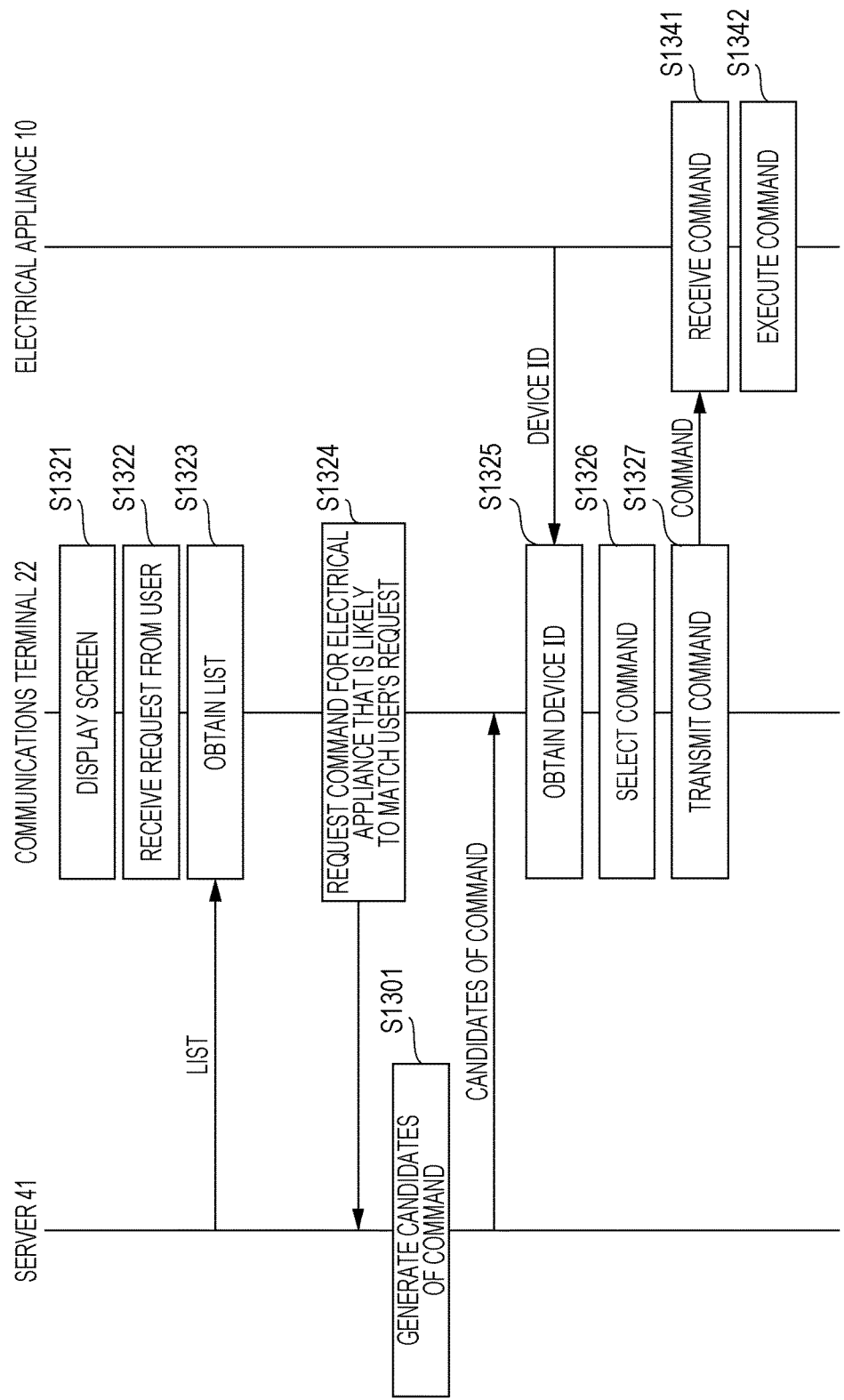
FIG. 13 is a sequence diagram illustrating the processing flow when a user's request is sent to an electrical appliance to be controlled using a communications terminal and a server according to the third exemplary embodiment.

Exchange of data among the electrical appliance 10, the communications terminal 22, and the server 40 performed when the communications terminal 22 according to the present exemplary embodiment controls the electrical appliance 10 is described below with reference to FIG. 13.

The processes in steps S1321 and S1322 are the same as those in steps S701 and S702 of the first exemplary embodiment (refer to FIG. 7), respectively.

In step S1323, the communications terminal 22 obtains the device list stored in the list storage unit 411B of the server 41.

In step S1324, the communications terminal 22 requests the server 41 to select commands for electrical appliances that are likely to match the request received from the user among the electrical appliances listed in the obtained device list and send the command to the communications terminal 22 via a network.

In step S1301, the server 41 generates candidates of a command requested by the communications terminal 22 and sends the candidates to the communications terminal 22. The communications terminal 22 receives the candidates of a command sent from the server 41.

The processes in steps S1325 to S1327 and steps S1341 and S1342 are the same as those in steps S705 to S707 and steps S721 and S722 of the first exemplary embodiment (refer to FIG. 7), respectively.

In the above-described configuration, since the server 41 includes the list storage unit 411 and the command generating unit 414B, the system is as safe as the system of the second exemplary embodiment. In addition, since the list obtaining unit 212B of the communications terminal 22 obtains a device list of the electrical appliances that are likely to satisfy the user's request, the processing speed can be increased from that of the configuration according to the second exemplary embodiment.

Fourth Exemplary Embodiment

According to a fourth exemplary embodiment, a communications terminal includes a list storage unit and a list obtaining unit. Other system configurations are the same as those of the second exemplary embodiment. Note that the same numbering will be used in describing a component as was utilized above in describing the exemplary embodiments, and description of the component is not repeated, where appropriate.

A communication system 101 is the same as that of the first exemplary embodiment.

A communications terminal 23 and a server 42 according to the present exemplary embodiment are described in detail below with reference to the accompanying drawings.

Figure 14:
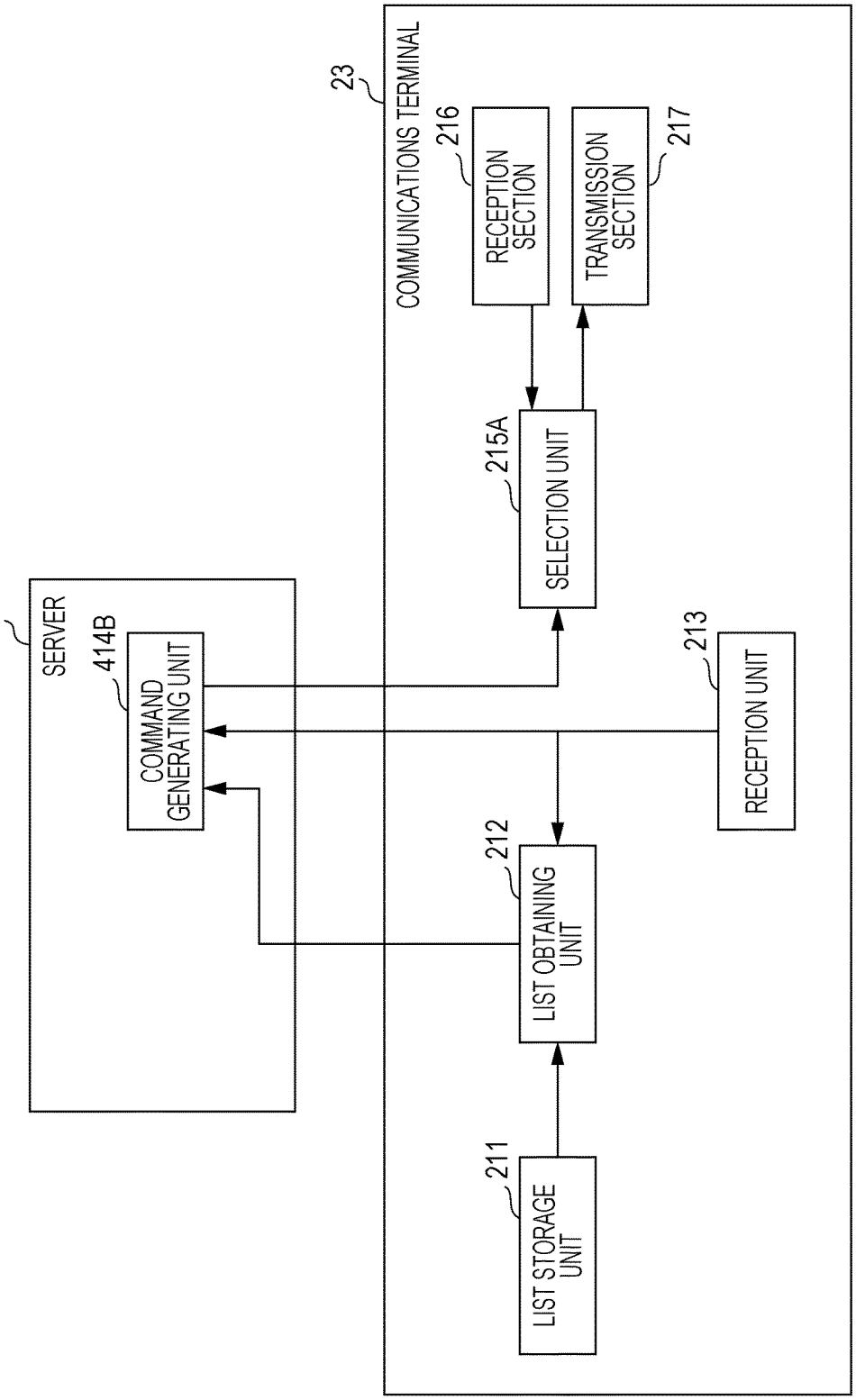
FIG. 14 is a block diagram of the configurations of a communications terminal and a server according to a fourth exemplary embodiment.

FIG. 14 is a block diagram of the configurations of the communications terminal 23 and the server 42 according to the present exemplary embodiment.

The communications terminal 23 includes a list storage unit 211, a list obtaining unit 212, a reception unit 213, a selection unit 215A, a reception section 216, and a transmission section 217.

The list storage unit 211, the list obtaining unit 212, the reception unit 213, the selection unit 215A, the reception section 216, and the transmission section 217 are the same as those of the third exemplary embodiment (refer to FIG. 12).

The server 42 includes a command generating unit 414B. The command generating unit 414B is the same as that of the second exemplary embodiment (refer to FIG. 10).

Through the above-described configuration, commands for the request input to the communications terminal 23 by the user can be generated from the device list stored in the server 42.

In addition, the command for the electrical appliance 10 to be controlled can be selected by the communications terminal 23. Thus, the command can be transmitted to the electrical appliance 10 to set up the electrical appliance 10.

Figure 15:
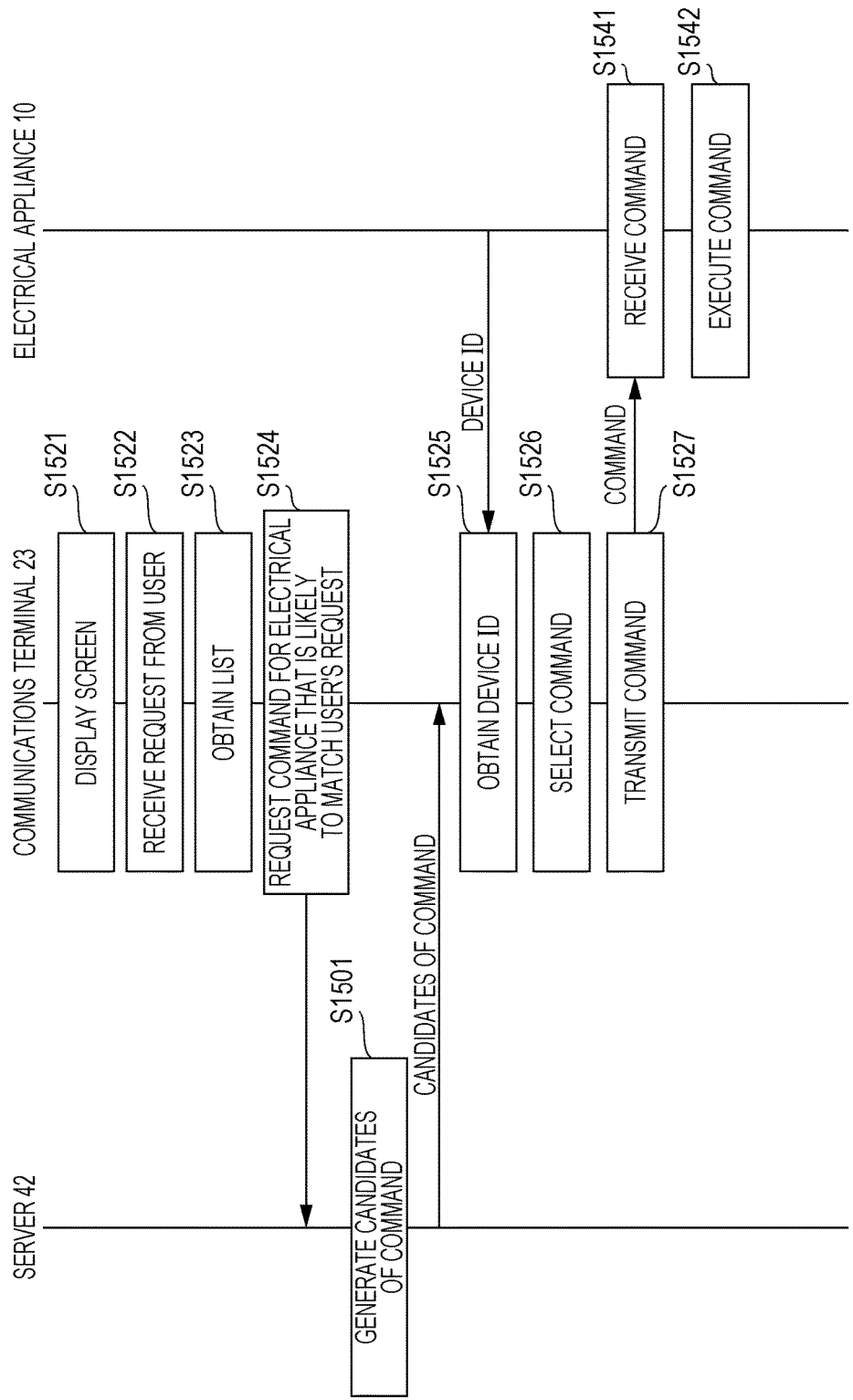
FIG. 15 is a sequence diagram illustrating the processing flow when a user's request is sent from a communications terminal to an electrical appliance to be controlled via a server according to the fourth exemplary embodiment.

Exchange of data among the electrical appliance 10, the communications terminal 23, and the server 42 performed when the communications terminal 23 according to the present exemplary embodiment controls the electrical appliance 10 is described below with reference to FIG. 15.

The processes in steps S1521 and S1522 are the same as those in steps S701 and S702 of the first exemplary embodiment (refer to FIG. 7), respectively.

In step S1523, the list obtaining unit 212 of the communications terminal 23 obtains the device list stored in the list storage unit 211.

In step S1524, the communications terminal 23 obtains, from the device list stored in the list storage unit 211, a device list of the electrical appliances that are likely to match the request received from the user. In addition, the communications terminal 23 requests, via a network, the server 42 to select commands for the electrical appliances that are likely to match the request received from the user among the obtained electrical appliances.

The processes in step S1501, steps S1525 to S1527 and steps S1541 and S1542 are the same as those in step S1301, steps S1325 to S1327 and steps S1341 and S1342 of the third exemplary embodiment (refer to FIG. 13), respectively.

In the above-described configuration, since the server 42 includes the command generating unit 414B and, in addition, the communications terminal 23 includes the list storage unit 211, the system is safer than the system of the first exemplary embodiment, although the system is less safe than the system of the second or third exemplary embodiment. In addition, since the communications terminal 23 includes the list storage unit 211 and the list obtaining unit 212, the processing speed can be increased from that of the configuration according to the third exemplary embodiment.

Fifth Exemplary Embodiment

According to a fifth exemplary embodiment, a communications terminal includes a command generating unit. Other system configurations are the same as those of the second exemplary embodiment. Note that the same numbering will be used in describing a component as was utilized above in describing the exemplary embodiments, and description of the component is not repeated, where appropriate.

An overall communication system 101 is the same as that of the first exemplary embodiment.

A communications terminal 24 and a server 43 according to the present exemplary embodiment are described in detail below with reference to the accompanying drawings.

Figure 16:
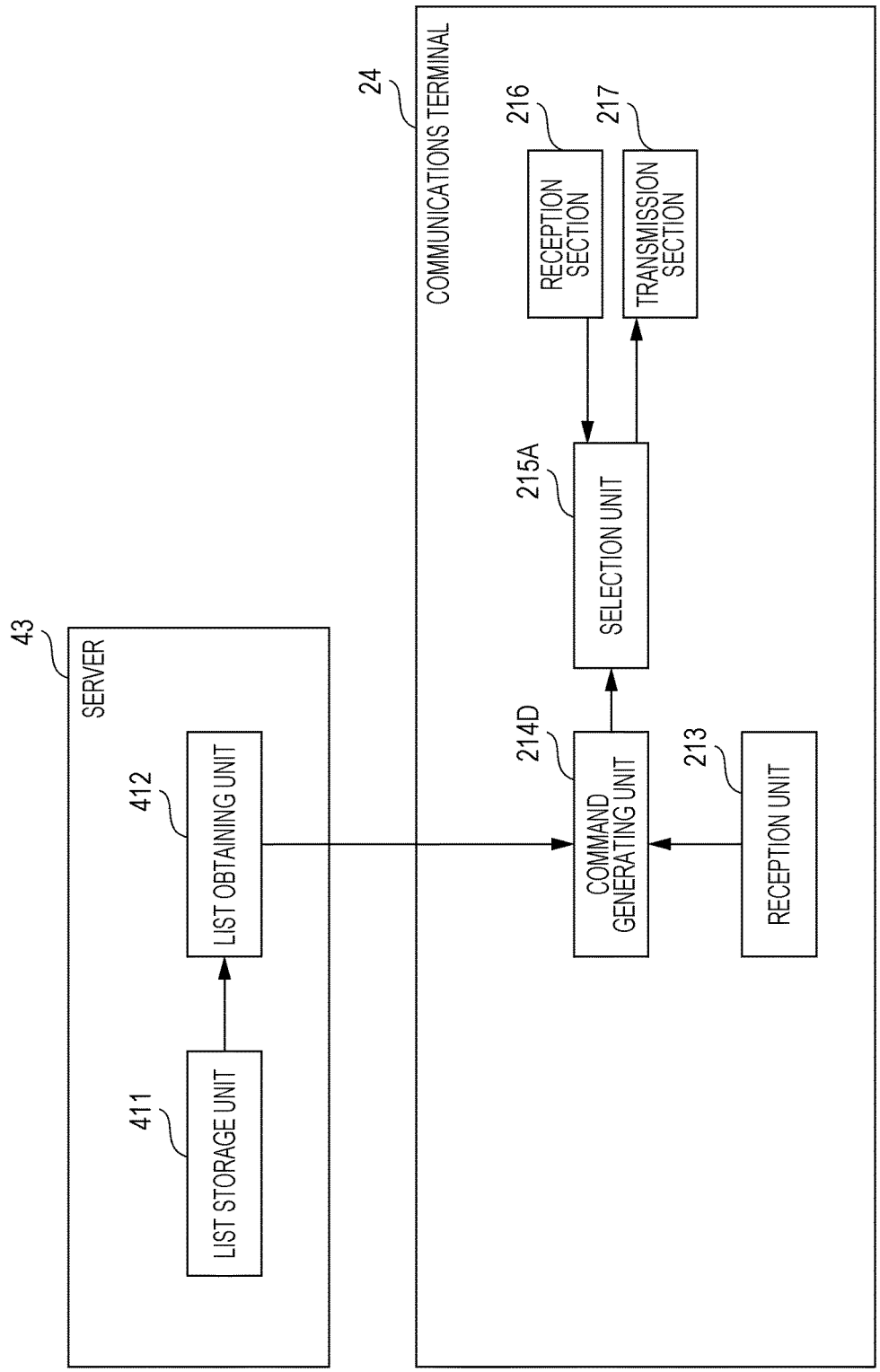
FIG. 16 is a block diagram of the configurations of a communications terminal and a sever according to a fifth exemplary embodiment.

FIG. 16 is a block diagram of the configurations of the communications terminal 24 and the server 43 according to the present exemplary embodiment.

The communications terminal 24 includes a command generating unit 214D, a reception unit 213, a selection unit 215A, a reception section 216, and a transmission section 217.

The reception unit 213, the selection unit 215A, the reception section 216, and the transmission section 217 are the same as those of the second exemplary embodiment (refer to FIG. 10).

The command generating unit 214D appends predetermined information in accordance with the electrical appliance to the setting information received by the reception unit 213. In this manner, the command generating unit 214D generates control information used for controlling the operation performed by the electrical appliance. The command generating unit 214D differs from the command generating unit 214 of the first exemplary embodiment in that the command generating unit 214D obtains the device list from the list obtaining unit 412 of the server 43.

The server 43 includes a list storage unit 411 and a list obtaining unit 412.

The list storage unit 411 and the list obtaining unit 412 are the same as those of the second exemplary embodiment (refer to FIG. 10).

Through the above-described configuration, a command for the request input to the communications terminal 24 by the user can be generated from the device list stored in the server 43.

In addition, the command for the electrical appliance 10 to be controlled can be selected using the communications terminal 24. Thus, the command can be transmitted to the electrical appliance 10 to set up the electrical appliance 10.

Figure 17:
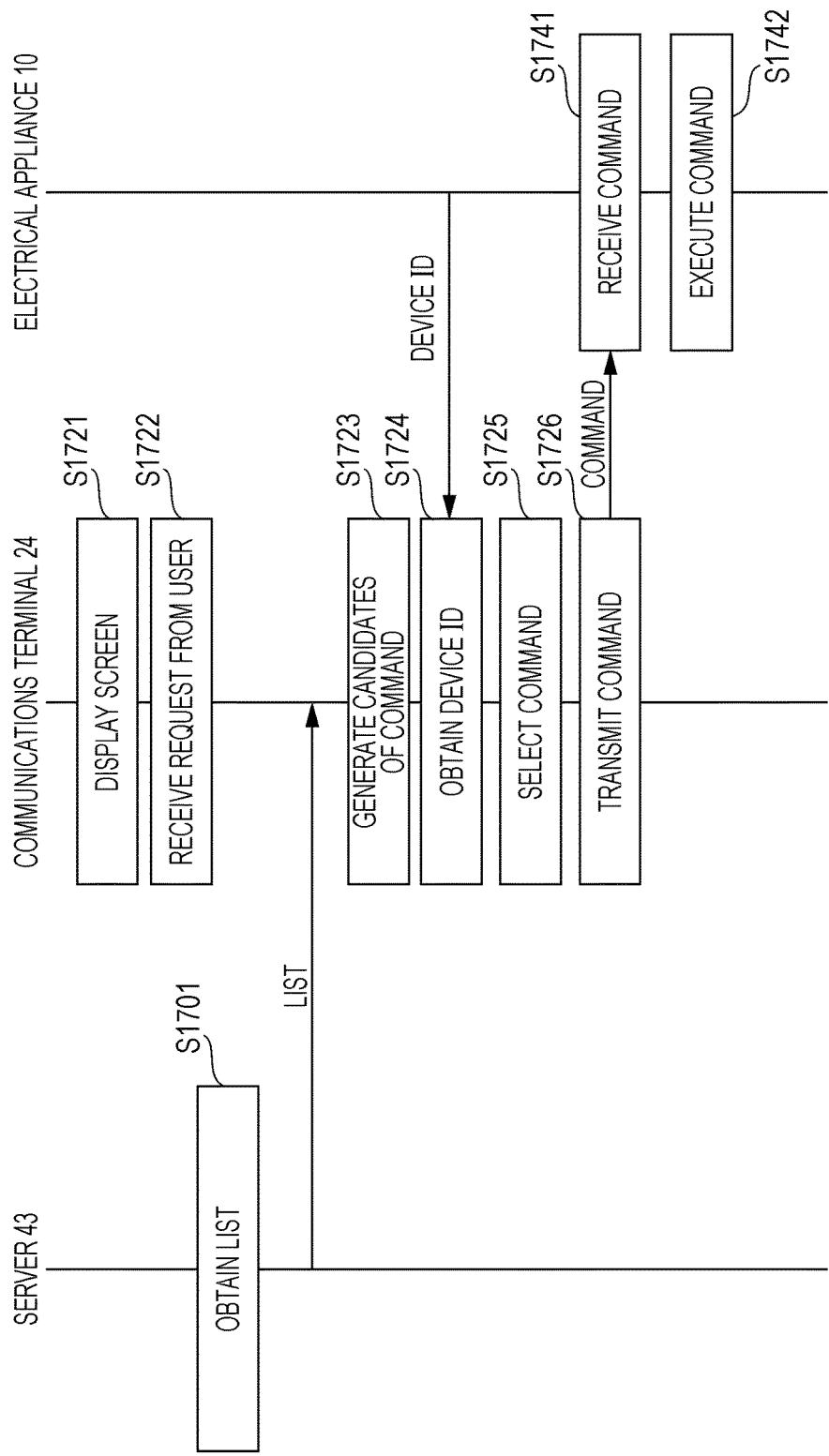
FIG. 17 is a sequence diagram illustrating the processing flow when a user's request is sent from the communications terminal to an electrical appliance to be controlled via a server according to the fifth exemplary embodiment.

Exchange of data among the electrical appliance 10, the communications terminal 24, and the server 43 performed when the communications terminal 24 according to the present exemplary embodiment controls the electrical appliance 10 is described below with reference to FIG. 17.

The processes in steps S1721 and S1722 are the same as those in steps S701 and S702 of the first exemplary embodiment (refer to FIG. 7), respectively.

In step S1701, the server 43 obtains the device list stored in the list storage unit 411 and sends the obtained device list to the communications terminal 24.

In step S1723, the communications terminal 24 generates candidates of a command for the electrical appliances that are likely to satisfy the request input by the user among the electrical appliances obtained by the list obtaining unit 412.

The processes in steps S1724 to S1726 and steps S1741 and S1742 are the same as those in steps S705 to S707 and steps S721 and S722 of the first exemplary embodiment (refer to FIG. 7), respectively.

In the above-described configuration, since the server 43 includes the list storage unit 411 and the list obtaining unit 412 and, in addition, the communications terminal 24 includes the command generating unit 214D, the system is safer than the system of the first exemplary embodiment, although the system is less safe than the system of the second or third exemplary embodiment. In addition, since the communications terminal 24 includes the command generating unit 214D, the processing speed can be increased from that of the configuration according to the third exemplary embodiment.

Sixth Exemplary Embodiment

According to a sixth exemplary embodiment, a communications terminal includes a list obtaining unit and a command generating unit. Other system configurations are the same as those of the second exemplary embodiment. Note that the same numbering will be used in describing a component as was utilized above in describing the exemplary embodiments, and description of the component is not repeated, where appropriate.

A communication system 101 is the same as that of the first exemplary embodiment.

A communications terminal 25 and a server 44 according to the present exemplary embodiment are described in detail below with reference to the accompanying drawings.

Figure 18:
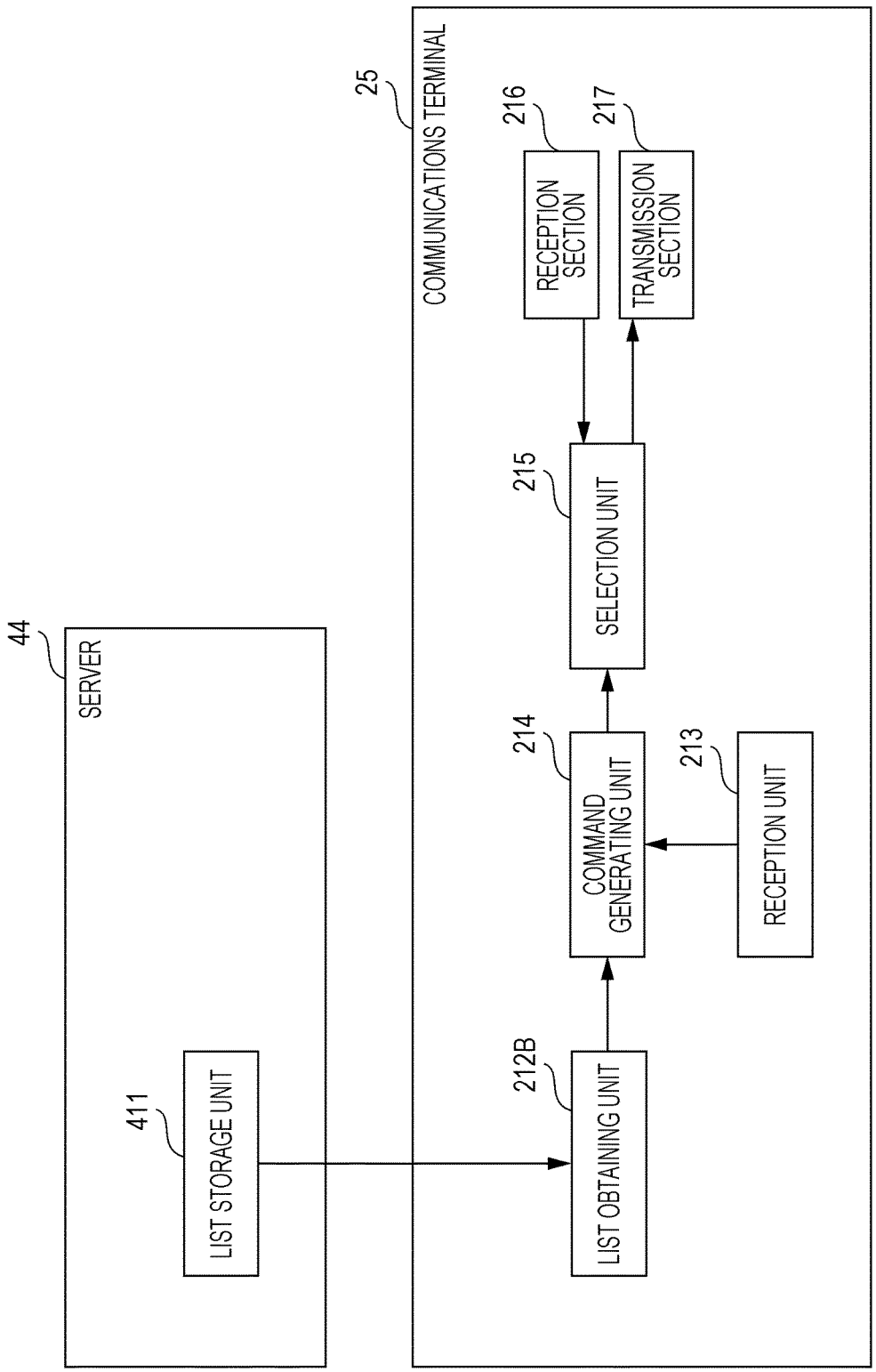
FIG. 18 is a block diagram of the configurations of a communications terminal and a server according to a sixth exemplary embodiment.

FIG. 18 is a block diagram of the configurations of the communications terminal 25 and the server 44 according to the present exemplary embodiment.

The communications terminal 25 includes a list obtaining unit 212B, a command generating unit 214, a reception unit 213, a selection unit 215, a reception section 216, and a transmission section 217.

The list obtaining unit 212B, the command generating unit 214, the reception unit 213, the selection unit 215, the reception section 216, and the transmission section 217 are the same as those of the second exemplary embodiment (refer to FIG. 10).

The server 44 includes a list storage unit 411.

The list storage unit 411 is the same as that of the second exemplary embodiment (refer to FIG. 10).

Through the above-described configuration, commands for the request input to the communications terminal 25 by the user can be generated from the device list stored in the server 44.

In addition, the command for the electrical appliance 10 to be controlled can be selected by the communications terminal 25. Thus, the command can be transmitted to the electrical appliance 10 to set up the electrical appliance 10.

Figure 19:
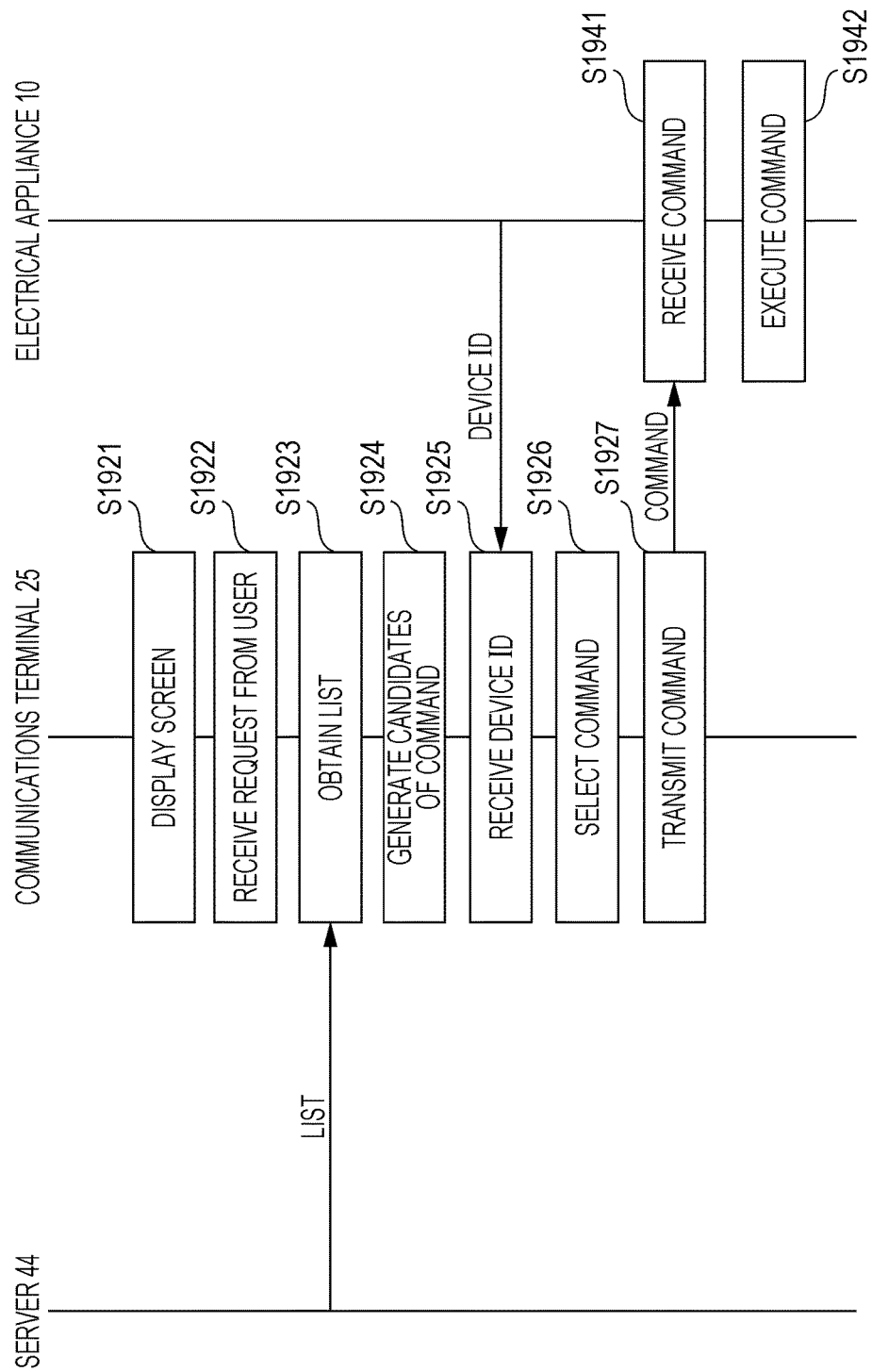
FIG. 19 is a sequence diagram illustrating the processing flow when a user's request is sent from the communications terminal to an electrical appliance to be controlled via a server according to the sixth exemplary embodiment.

Exchange of data among the electrical appliance 10, the communications terminal 25, and the server 44 performed when the communications terminal 25 according to the present exemplary embodiment controls the electrical appliance 10 is described below with reference to FIG. 19.

The processes in steps S1921 and S1922 are the same as those in steps S701 and S702 of the first exemplary embodiment (refer to FIG. 7), respectively.

In step S1323, the communications terminal 25 obtains the device list stored in the list storage unit 411 of the server 44.

In step S1324, the communications terminal 25 generates candidates of a command for the electrical appliances that are likely to satisfy the request input by the user among the obtained electrical appliances.

The processes in steps S1925 to S1927 and steps S1941 and S1942 are the same as those in steps S705 to S707 and steps S721 and S722 of the first exemplary embodiment (refer to FIG. 7), respectively.

In the above-described configuration, since the server 44 includes the list storage unit 411 and, in addition, the communications terminal 25 includes the list obtaining unit 212B and the command generating unit 214, the system is safer than the system of the first exemplary embodiment, although the system is less safe than the system of the second or third exemplary embodiment. In addition, since the communications terminal 25 includes the command generating unit 214, the processing speed can be increased so as to be the next lower processing speed to that of the configuration according to the first exemplary embodiment.

Note that in each of the above-described exemplary embodiments, the communications terminal may read a program stored in the server and execute the readout program so as to operate as the communications terminal defined in the exemplary embodiment. A communication system configured in such a manner is described next with reference to FIG. 20.

Figure 20:
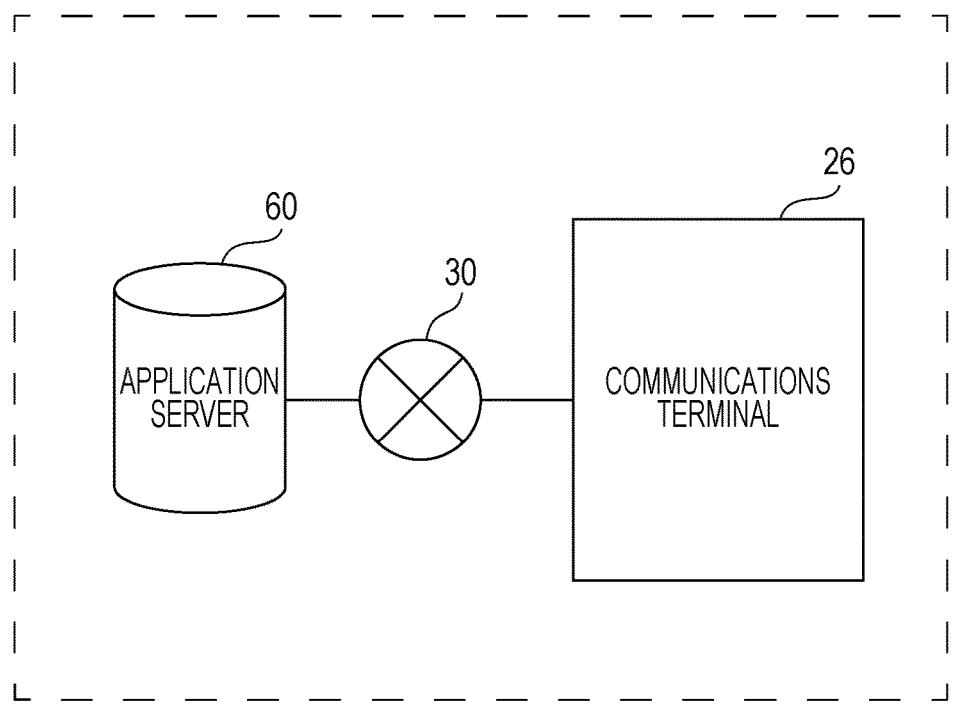
FIG. 20 is a schematic illustration of another configuration example of the communications terminal of each of the exemplary embodiments.

FIG. 20 is a schematic illustration of another configuration example of the communications terminal of each of the exemplary embodiments.

As illustrated in FIG. 20, a communications terminal 26 is connected to an application server 60 via a network 30.

The application server 60 stores a program (an application program) that is to be executed on the communications terminal 26 and that causes the communications terminal 26 to function as the communications terminal of each of the above-described exemplary embodiments. In addition, the application server 60 can communicate with the communications terminal 26 via the network 30.

The communications terminal 26 has a hardware configuration that is the same as that of the communications terminal 21 illustrated in FIG. 9B. Note that unlike the communications terminal 21, the second communication unit 205 can communicate with the application server 60 via the network 30.

The communications terminal 26 functions as the communications terminal of each of the above-described exemplary embodiments by obtaining (downloading) the program stored in the application server 60 via the network 30.

Figure 21:
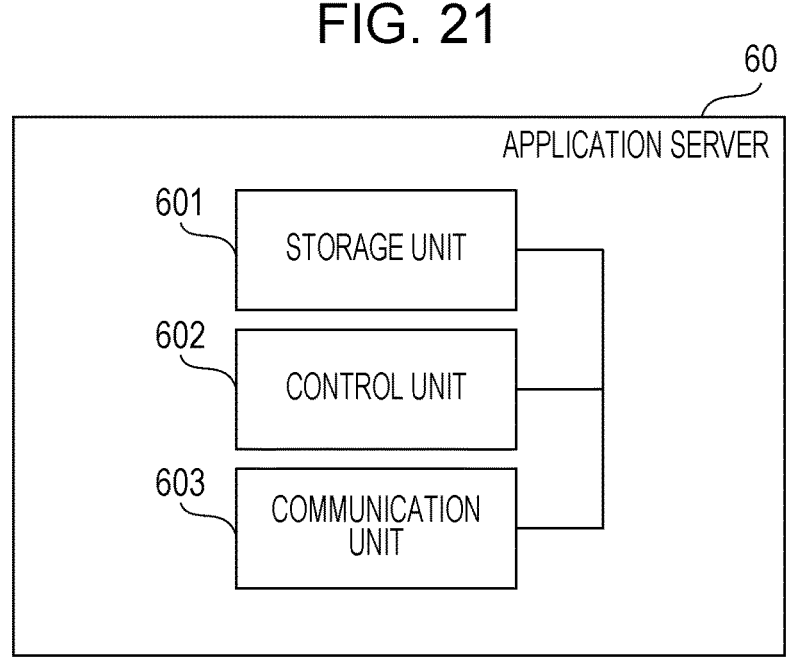
FIG. 21 is a block diagram of a configuration example of an application server connected to the communications terminal of each of the exemplary embodiments.

FIG. 21 is a block diagram of an example of the configuration of an application server connected to the communications terminal of each of the exemplary embodiments.

As illustrated in FIG. 21, the application server 60 includes a storage unit 601, a control unit 602, and a communication unit 603.

The storage unit 601 stores a program that is to be executed on the communications terminal 26 and that causes the communications terminal 26 to function as the communications terminal of each of the above-described exemplary embodiments.

The control unit 602 receives a request for the program from the communications terminal 26 via the network 30. Thereafter, the control unit 602 transmits, to the communications terminal 26, the program in accordance with the received request.

The communication unit 603 serves as a communication interface that can communicate with the communications terminal 26 via the network 30.

Through the above-described configuration, the program stored in the application server can be downloaded into a general-purpose communications terminal, and the communications terminal can execute the program. In this manner, the communications terminal can operate as the communications terminal of each of the above-described exemplary embodiments.

While the above exemplary embodiments have been described with reference to use of NFC communication as short range wireless communication performed through touch or proximity operation, another communication technique may be employed. For example, Bluetooth or Wi-Fi communication may be employed. In the case of Bluetooth communication, a command can be selected on the basis of the device ID of an electrical appliance that is paired with the communications terminal.

Alternatively, a command for an electrical appliance located in the vicinity can be selected on the basis of the location information regarding a communications terminal and the electrical appliance. In addition, a command for an electrical appliance located in the same room as the communications terminal can be selected on the basis of the location information. Alternatively, a command can be selected on the basis of the operating condition of an electrical appliance. For example, if a user is watching television (if the television set is turned on), a command for the television can be selected. Still alternatively, a command can be selected on the basis of the behavior of the user. For example, the system may learn user's daily schedule (e.g., the user uses a cooking range at 9 o'clock, uses a washing machine at 10 o'clock, and uses an IH cooking heater at 11 o'clock) and estimate the operation the user is likely to perform and, thus, select a command.

Note that in the above-described exemplary embodiments, the components may be configured by dedicated hardware or by executing software programs suitable for the components. The component may be realized by a software program that is stored in a recording medium, such as a hard disk or a semiconductor memory, and that is read and executed by a program execution unit, such as a CPU or a processor. The software described below can realize the communications terminals of the above-described exemplary embodiments.

That is, the program causes a computer to perform a method of controlling an electrical appliance using a communications terminal. The control method including receiving setting information containing a first property and a setting of the first property, the first property representing a property of an operation performed by one or more target appliances to be controlled, obtaining correspondence information between device information identifying each of a plurality of the appliances and a second property, the second property representing a property of an operation performed by the appliance identified by the device information, extracting the device information items of one or more target appliances from among the device information items in the correspondence information, the device information items each having a second property that is the same as the first property contained in the setting information, generating a plurality of control information items each associated with each of the extracted device information items of one or more target appliances, containing the setting information and a predetermined information corresponding to the first property of the setting information and each of the device information items, receiving the device information regarding the target appliance from the target appliance through wireless communication, selecting, from among the generated control information items, the control information item indicating the operation performed by the target appliance identified by the received device information; and transmitting the selected control information item to the target appliance through wireless communication.

While a communications terminal according to at least one aspect of the disclosure has been described with reference to an exemplary embodiment, it is to be understood that the disclosure is not limited to the exemplary embodiment. Various modifications and alterations of this disclosure will become apparent to those skilled in the art without departing from the scope and principles of the appended claims, and it should be understood that the various modifications and alterations are to be included in the at least one aspect of the disclosure.

The communication system according to the present disclosure is useful as a communication system that provides a simplified extended user interface with an electrical appliance to a user so that the user can transmit a request to the electrical appliance and set up the request through a relatively simplified operation using a mobile device, such as a cell phone or a smart phone.

What is claimed is:

1. A control method of controlling a plurality of appliances using a communications terminal, the control method comprising:
   receiving, from a user at the communications terminal, time setting information containing a first property and a setting of the first property, the first property representing a property of an operation performed by at least one target appliance, of the plurality of appliances, to be controlled;
   obtaining at the communications terminal, correspondence information including a plurality of device information items and a plurality of second properties associated with each other, each device information item identifying one of the plurality of appliances, each second property representing a property of an operation performed by an appliance identified by the device information item;
   extracting a list of device information items from the correspondence information, based on the second property that is the same as the first property contained in the time setting information;
   generating a list of control information items, each control information containing one device information tern of the extracted list of device information items, the time setting information and predetermined information corresponding to the first property contained in the time setting information, wherein when the setting of the first property is not specified in the time setting information, a default time setting is set;
   in response to the user moving the communications terminal close to the target appliance of the plurality of appliances, receiving the device information item of the target appliance from the target appliance through wireless communication;
   selecting, from the generated list of control information items, a control information item indicating the operation performed by the target appliance identified by the received device information item;
   transmitting the selected control information item to the target appliance through wireless communication; and
   operating on the transmitted selected control information item at the target appliance.

2. The method according to claim 1, wherein the correspondence information is obtained from a list stored in a storage of the communications terminal, and the list indicates a correspondence between the plurality of device information items and the plurality of second properties.

3. The method according to claim 2, wherein the list stored in the storage of the communications terminal contains, as the device information item, a device identifier uniquely identifying an appliance preselected by the user.

4. The control method according to claim 2, wherein each of the at least one device information item extracted from the correspondence information is associated, in the correspondence information, with the second property that is the same as the first property contained in the time setting information.

5. The method according to claim 1, wherein the communications terminal communicates with a server including a list indicating a correspondence between the plurality of device information items and the plurality of second properties, and
wherein the correspondence information is obtained from the list included in the server.

6. The method according to claim 1, wherein the receiving of time setting information includes receiving the time setting information using voice uttered from the user.

7. The method according to claim 1, wherein the wireless communication is a short range wireless communication which is started by a touch operation, in which the user brings the communications terminal into contact with the appliance, and
wherein the short range wireless communication performed in the receiving of the device information item and the short range wireless communication performed in the transmitting of the selected control information item are started by a single touch operation.

8. The method according to claim 1, wherein the receiving of the time setting information includes presenting information for prompting the user to input time setting information and receiving the time setting information input by the user in accordance with the presented information.

9. The method according to claim 1, wherein each of the first property and the second property includes at least one of a time point at which the appliance starts operating, and a time length of an operation performed by the appliance.

10. The control method according to claim 1, wherein the time setting information received by the user does not include the device information item.

11. A communications terminal for controlling a plurality of appliances comprising a processor that, when executing a program, performs operations comprising:
receiving, from a user at the communications terminal, time setting information containing a first property and a setting of the first property, the first property representing a property of an operation performed by at least one target appliance, of the plurality of appliances, to be controlled;
obtaining, at the communications terminal, correspondence information including a plurality of device information items and a plurality of second properties associated with each other, each device information item identifying one of the plurality of appliances, each second property representing a property of an operation performed by an appliance identified by the device information item;
extracting a list of device information items from the correspondence information, based on the second property that is the same as the first property contained in the time setting information;
generating a list of control information items, each control information item containing one device information item of the extracted list of device information items, the time setting information and predetermined information corresponding to the first property contained in the time setting information, wherein when the setting of the first property is not specified in the time setting information, a default time setting is set;
in response to the user moving the communications terminal close to the target appliance of the plurality of appliances, receiving the device information item of the target appliance through wireless communication from the target appliance;
selecting, from the generated list of control information items, a control information item indicating the operation performed by the target appliance identified by the received device information item; and
transmitting the selected control information item to the target appliance through wireless communication, wherein the target appliance operates on the transmitted selected control information item.

12. A control system including a communications terminal of controlling a plurality of appliances, the communications terminal comprising a processor that, when executing a program, performs operations comprising:
receiving, from a user at the communications terminal, time setting information containing a first property and a setting of the first property, the first property representing a property of an operation performed by at least one target appliance, of the plurality of appliances, to be controlled;
obtaining, at the communications terminal, correspondence information including a plurality of device information items and a plurality of second properties associated with each other, each device information item identifying one of the plurality of appliances, each second property representing a property of an operation performed by the appliance identified by the device information item;
extracting a list of device information items from the correspondence information based on the second property that is the same as the first property contained in the setting information;
generating a list of control information items, each control information item containing one device information item of the extracted list of device information items, the time setting information and predetermined information corresponding to the first property contained in the setting information, wherein when the setting of the first property is not specified in the time setting information, a default time setting is set;
in response to the user moving the communications terminal close to the target appliance of the plurality of appliances, receiving the device information item of the target appliance through wireless communication from the target appliance;
selecting, from the generated list of control information items, a control information item indicating the operation performed by the target appliance identified by the received device information item; and
transmitting the selected control information item to the target appliance through wireless communication, wherein the target appliance operates on the transmitted selected control information item.

* * * * *